US010035109B2

(12) United States Patent
Lee et al.

(10) Patent No.: US 10,035,109 B2
(45) Date of Patent: Jul. 31, 2018

(54) CROSSLINKED, THERMALLY REARRANGED POLY(BENZOXAZOLE-CO-IMIDE), GAS SEPARATION MEMBRANES COMPRISING THE SAME AND PREPARATION METHOD THEREOF

(71) Applicant: IUCF-HYU (INDUSTRY-UNIVERSITY COOPERATION FOUNDATION HANYANG UNIVERSITY), Seoul (KR)

(72) Inventors: Young Moo Lee, Seoul (KR); Mariola Calle, Seoul (KR); Hye Jin Jo, Chungcheongnam-do (KR); Jongmyeong Lee, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 125 days.

(21) Appl. No.: 15/036,620

(22) PCT Filed: Nov. 5, 2014

(86) PCT No.: PCT/KR2014/010513
§ 371 (c)(1),
(2) Date: May 13, 2016

(87) PCT Pub. No.: WO2015/072692
PCT Pub. Date: May 21, 2015

(65) Prior Publication Data
US 2016/0271570 A1   Sep. 22, 2016

(30) Foreign Application Priority Data

Nov. 15, 2013  (KR) .................. 10-2013-0139213
Nov. 15, 2013  (KR) .................. 10-2013-0139215

(51) Int. Cl.
*B01D 53/22*  (2006.01)
*B01D 67/00*  (2006.01)
(Continued)

(52) U.S. Cl.
CPC .......... *B01D 71/64* (2013.01); *B01D 53/228* (2013.01); *B01D 67/0006* (2013.01);
(Continued)

(58) Field of Classification Search
CPC ............. B01D 53/228; B01D 67/0006; B01D 67/0083; B01D 71/58; B01D 71/62; B01D 71/64; B01D 2323/30; C08G 73/1039; C08G 73/1067; C08G 73/22; C09D 179/04; C09D 179/08
See application file for complete search history.

(56) References Cited

U.S. PATENT DOCUMENTS 4,087,409 A  *  5/1978  Preston ............... C08G 73/1067
                                                        528/229
9,440,185 B2 *  9/2016  Lee ..................... B01D 67/0006
(Continued)

FOREIGN PATENT DOCUMENTS

KR    1020050044232      5/2005
KR    1020060085846      7/2006
(Continued)

OTHER PUBLICATIONS

Soo, Chye Yang et al., "Effect of the chemical structure of various diamines on the gas separation of thermally rearranged poly(benzoxazole-co-imide) (TR-PBO-co-I) membranes", Journal of Membrane Science, 444, Jun. 2013, pp. 365-377. (Year: 2013).*
Calle, Mariola et al., "The relationship between the chemical structure and thermal conversion temperatures of thermally rearranged (TR) polymers", Polymer, 53, Apr. 2012, pp. 2783-2791. (Year: 2012).*
Zhang, "Polymer Physics", Chemical Industry Press, Jan. 31, 1981, p. 22-24.
(Continued)

*Primary Examiner* — Jason M Greene
(74) *Attorney, Agent, or Firm* — Duane Morris LLP; J. Rodman Steele, Jr.; Gregory M. Lefkowitz

(57) ABSTRACT

The present disclosure relates to a crosslinked, thermally rearranged poly(benzoxazole-co-imide) copolymer membrane prepared simply by heat-treating a membrane prepared from an o-hydroxypolyimide copolymer having carboxylic acid groups such that thermal crosslinking and thermal rearrangement occur simultaneously or a gas separation membrane containing a crosslinked, thermally rearranged poly(benzoxazole-co-imide) copolymer having a benzoxazole group content of less than 80% in the polymer chain, prepared from transesterification crosslinking of an o-hydroxypolyimide copolymer having carboxylic acid groups and a diol-based compound followed by thermal rearrangement, and a method for preparing the same (a membrane for flue gas separation is excluded).

In accordance with the present disclosure, a crosslinked, thermally rearranged poly(benzoxazole-co-imide) copolymer membrane for gas separation can be prepared simply through heat treatment without requiring a complicated process such as chemical crosslinking, UV irradiation, etc. for forming a crosslinked structure and a gas separation membrane (a membrane for flue gas separation is excluded) prepared therefrom exhibits superior permeability and selectivity. Also, the method is applicable to commercial-scale production because the preparation process is simple.

12 Claims, 7 Drawing Sheets

(51) Int. Cl.
   *B01D 71/64*    (2006.01)
   *C08G 73/22*    (2006.01)
   *C08G 73/10*    (2006.01)
   *C09D 179/04*   (2006.01)
   *C09D 179/08*   (2006.01)

(52) U.S. Cl.
   CPC ..... *B01D 67/0083* (2013.01); *C08G 73/1039* (2013.01); *C08G 73/1067* (2013.01); *C08G 73/22* (2013.01); *C09D 179/04* (2013.01); *C09D 179/08* (2013.01); *B01D 2323/30* (2013.01)

(56) References Cited

U.S. PATENT DOCUMENTS

| | | | | |
|---|---|---|---|---|
| 2003/0126990 | A1* | 7/2003 | Koros | B01D 53/228 96/10 |
| 2009/0297850 | A1* | 12/2009 | Jung | B01D 53/22 428/398 |
| 2010/0099804 | A1 | 4/2010 | Lee et al. | |
| 2010/0133192 | A1* | 6/2010 | Liu | B01D 53/228 210/654 |
| 2012/0305484 | A1* | 12/2012 | Freeman | B01D 71/62 210/640 |
| 2015/0094500 | A1* | 4/2015 | Liu | B01D 71/64 568/917 |

FOREIGN PATENT DOCUMENTS

| | | |
|---|---|---|
| KR | 1020120067645 | 6/2012 |
| KR | 1020130013202 | 2/2013 |

OTHER PUBLICATIONS

Calle et al., "Cross-Linked Thermally Rearranged Poly(benzoxazole-co-imide Membranes for Gas Separation", Macromolecules, 2013, 46, p. 8179-8189.

Qiu et al., "Sub-Tg Cross-Linking of a Polyimide Membrane for Enhanced Co2 Plasticization Resistance for Natural Gas Separation", Macromolecules, 2011, 44, pp. 6046-6056.

* cited by examiner

US 10,035,109 B2

CROSSLINKED, THERMALLY REARRANGED POLY(BENZOXAZOLE-CO-IMIDE), GAS SEPARATION MEMBRANES COMPRISING THE SAME AND PREPARATION METHOD THEREOF

CROSS-REFERENCE TO RELATED APPLICATIONS

This application is a § 371 national stage entry of International Application No. PCT/KR2014/010513 filed on Nov. 5, 2014, which claims priority to South Korean Patent Application No. 10-2013-0139213 filed on Nov. 15, 2013 and South Korean Patent Application No. 10-2013-0139215 filed on Nov. 15, 2013, the entire contents of which are incorporated herein by reference.

TECHNICAL FIELD

The present disclosure relates to a crosslinked, thermally rearranged poly(benzoxazole-co-imide) copolymer, a gas separation membrane containing the same and a method for preparing the same (a membrane for flue gas separation is excluded). More particularly, it relates to a crosslinked, thermally rearranged poly(benzoxazole-co-imide) copolymer membrane prepared simply by heat-treating a membrane prepared from an o-hydroxypolyimide copolymer having carboxylic acid groups such that thermal crosslinking and thermal rearrangement occur simultaneously or a gas separation membrane containing a crosslinked, thermally rearranged poly(benzoxazole-co-imide) copolymer having a benzoxazole group content of less than 80% in the polymer chain, prepared from transesterification crosslinking of an o-hydroxypolyimide copolymer having carboxylic acid groups and a diol-based compound followed by thermal rearrangement, and a method for preparing the same (a membrane for flue gas separation is excluded).

BACKGROUND ART

Recently, membrane-based gas separation is drawing attentions as a rapidly growing separation technology. Gas separation using membranes has many advantages over the existing separation processes, including high-level process availability, low energy consumption and low operation cost. Particularly, there have been many basic researches on organic polymer membranes since 1980s. However, the traditional polymer exhibits relatively low material transport rate because it has few micropores.

In contrast, polymers having high level of free volume, known as microporous organic polymers, which can adsorb small gas molecules and exhibit improved diffusion capacity, are emerging as leading candidates in separation processes. Therefore, based on the fact that microporous polymers having a rigid ladder-like structure that prevents effective packing of the polymer chain exhibit relatively high gas permeability and selectivity, various researches are being conducted to develop organic polymers that can be used for gas separation membranes.

For example, efforts are being actively made to use rigid, glassy, pre-aromatic organic polymers exhibiting superior thermal, mechanical and chemical properties such as polybenzoxazole, polybenzimidazole, polybenzothiazole, etc. as gas separation membranes. However, because these organic polymers are mostly hardly soluble in general organic solvents, it is difficult to prepare membranes by the simple and practical solvent casting method. Recently, the inventors of the present disclosure reported that a polybenzoxazole membrane prepared by thermally rearranging polyimide having hydroxyl groups at ortho positions exhibits 10-100 times higher carbon dioxide permeability as compared to the existing polybenzoxazole membrane prepared by the solvent casting method. However, the carbon dioxide/methane ($CO_2/CH_4$) selectivity is still comparable to that of the existing commercially available cellulose acetate and needs to be improved (non-patent document 1).

The inventors of the present disclosure also reported that introduction of benzoxazole groups to the hydroxypolyimide copolymer membrane through thermal rearrangement leads to increased rigidity of the polymer chain, thereby improving gas separation performance owing to increased free volume. However, if the content of the benzoxazole groups introduced into the polymer chain is 80% or higher, the resulting membrane may break easily and exhibit poor mechanical properties because it is too hard. Also, a large-area membrane may exhibit unsatisfactory gas permeability and selectivity owing to shrinkage caused by release of a large quantity of $CO_2$ during the thermal rearrangement (non-patent document 2).

Also, it was reported that a polybenzoxazole membrane prepared by thermally rearranging a blend membrane of polyimide having hydroxyl groups at ortho positions and poly(styrene sulfonate) at 300-650° C. exhibits up to about 95% improved carbon dioxide/methane ($CO_2/CH_4$) selectivity as compared to the polybenzoxazole membrane prepared by thermally rearranging hydroxypolyimide not containing poly(styrene sulfonate). However, since a method of synthesizing the polyimide as a precursor for preparing the polybenzoxazole membrane is not specified, the fact that the free volume element and gas separation performance of the thermally rearranged polybenzoxazole membrane can vary depending on the imidization method of the hydroxypolyimide, i.e., solution thermal imidization, azeotropic thermal imidization, solid state thermal imidization or chemical imidization, is not considered at all (patent document 1).

In consideration of the fact that the properties of thermally rearranged polybenzoxazole are affected by the synthesis method of the aromatic polyimide, polyimides having hydroxyl groups at ortho positions were synthesized using various methods including solution thermal imidization, solid state thermal imidization, chemical imidization, etc. and polybenzoxazole membranes were prepared by thermally rearranging them. However, the resulting membrane is for use as a separation membrane for dehydration of ethanol or other organic solvents utilizing its superior separation characteristics derived from its peculiar porous structure, not as a gas separation membrane (patent document 2).

Also, it was reported that a polybenzoxazole membrane prepared by synthesizing polyimide having hydroxyl groups at ortho positions by chemical imidization followed by thermal rearrangement and UV irradiation to form a crosslinked structure exhibits improved selectivity. However, because the polyimide is prepared by chemical imidization, not by thermal imidization, the resulting thermally rearranged polybenzoxazole membrane still has relatively low carbon dioxide permeability. In addition, the process is disadvantageous in that a UV radiating apparatus has to be used to form the crosslinked structure (patent document 3).

Noting that the mechanical properties, membrane area shrinkage and gas transportation behavior of a thermally rearranged polybenzoxazole membrane are determined by the imidization method of polyimide, the benzoxazole group content in the polymer chain and the crosslinked structure of the polymer chain, the inventors of the present disclosure have found out that a crosslinked, thermally rearranged polybenzoxazole membrane can be obtained by synthesizing a polyimide membrane having hydroxyl and carboxylic acid groups in the polyimide repeat unit through solution thermal imidization and then simply heat-treating the same.

Also, they have found out that a polybenzoxazole membrane having a crosslinked structure with a benzoxazole group content of less than 80% in the polymer chain, which is prepared by synthesizing a copolymer having hydroxyl and carboxylic acid groups in the polyimide repeat unit and having a hydroxypolyimide content of less than 80% in the polyimide repeat unit by solution thermal imidization followed by chemical crosslinking and then thermal rearrangement, or chemical crosslinking and thermal rearrangement at the same time, exhibits remarkably improved separation performance as a gas separation membrane due to superior mechanical and thermal properties.

REFERENCES OF THE RELATED ART

Patent Documents

| | |
|---|---|
| Patent document 1 | Korean Patent Publication No. 10-2012-0100920. |
| Patent document 2 | US Patent Publication No. US 2012/0305484. |
| Patent document 3 | Japanese Patent Publication No. 2012-521871. |

Non-Patent Documents

| | |
|---|---|
| Non-patent document 1 | Y.M. Lee et al., Science 318, 254-258 (2007). |
| Non-patent document 2 | Y.M. Lee et al., J. Membr. Science 350, 301-309 (2010). |

DISCLOSURE

Technical Problem

The present disclosure is directed to providing a method for preparing a crosslinked, thermally rearranged poly(benzoxazole-co-imide) copolymer membrane for gas separation, which exhibits superior gas permeability and selectivity, and a gas separation membrane prepared using the same (a membrane for flue gas separation is excluded).

The present disclosure is also directed to providing a novel crosslinked, thermally rearranged poly(benzoxazole-co-imide) copolymer having a benzoxazole group content of less than 80% in the polymer chain, a gas separation membrane containing the same, which exhibits superior mechanical and thermal properties, decreased membrane area shrinkage and high gas permeability and selectivity, and a method for preparing the same (a membrane for flue gas separation is excluded).

Technical Solution

In an aspect, the present disclosure provides a method for preparing a crosslinked, thermally rearranged poly(benzoxazole-co-imide) copolymer membrane for gas separation (a membrane for flue gas separation is excluded), including:

i) obtaining a polyamic acid solution by reacting an acid dianhydride, an o-hydroxydiamine and 3,5-diaminobenzoic acid, as a comonomer, and synthesizing an o-hydroxypolyimide copolymer having carboxylic acid groups through azeotropic thermal imidization;

ii) preparing a membrane by dissolving the o-hydroxypolyimide copolymer having carboxylic acid groups synthesized in i) in an organic solvent and casting the same; and iii) heat-treating the membrane obtained in ii).

The acid dianhydride in i) may be represented by General Formula 1:

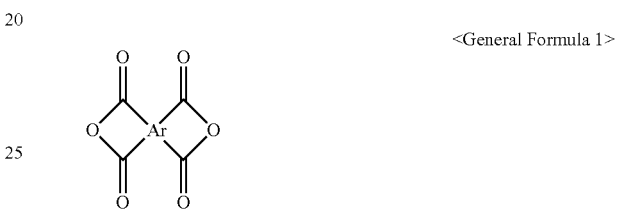

<General Formula 1> wherein Ar is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH.

The o-hydroxydiamine in i) may be represented by General Formula 2:

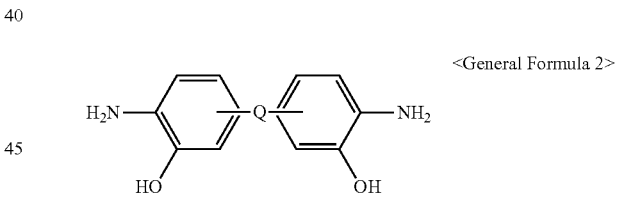

<General Formula 2> wherein Q is a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$, CO—NH, $C(CH_3)(CF_3)$ or a substituted or unsubstituted phenylene group.

The azeotropic thermal imidization in i) may be conducted by adding toluene or xylene to the polyamic acid solution and stirring the mixture at 180-200° C. for 6-12 hours.

The heat treatment in iii) may be conducted by raising temperature to 350-450° C. at a rate of 1-20° C./min under high-purity inert gas atmosphere and maintaining the temperature for 0.1-3 hours.

In another aspect, the present disclosure provides a crosslinked, thermally rearranged poly(benzoxazole-co-imide) copolymer membrane for gas separation (a membrane for flue gas separation is excluded) prepared by the preparation method.

The membrane may have a repeat unit represented by Chemical Formula 1:

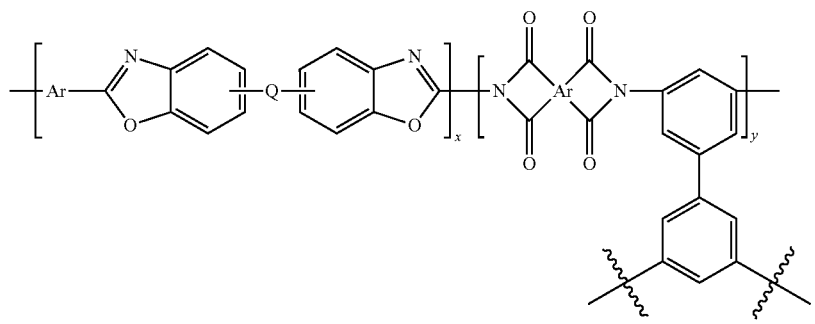

<Chemical Formula 1> wherein

Ar is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, Q is a single bond, O, S, CO, $SO_2$, $Si(CH_3)_2$, $(CH_2)_p$, ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, and x and y are molar fractions in the repeat unit, satisfying $0.75 \leq x \leq 0.975$, $0.025 \leq y \leq 0.25$ and $x+y=1$.

The membrane may have a d-spacing of 0.62-0.67 nm.

The membrane may have a density of 1.38-1.43 g/cm³.

The membrane may have an average pore diameter $d_3$ of 4.0 Å and an average pore diameter $d_4$ of 8.6 Å.

In another aspect, the present disclosure provides a crosslinked, thermally rearranged poly(benzoxazole-co-imide) copolymer having a repeat unit represented by Chemical Formula 2:

Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, $Ar_2$ is an aromatic ring group selected from a substituted or unsubstituted divalent $C_6$-$C_{24}$ arylene group and a substituted or unsubstituted divalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, and x, y and z are molar fractions in the repeat unit, satisfying $x<0.8$ and $x+y+z=1$, except for the case where x, y or z is 0.

The crosslinked, thermally rearranged poly(benzoxazole-co-imide) copolymer may have a d-spacing of 6.67-6.79 Å.

The crosslinked, thermally rearranged poly(benzoxazole-co-imide) copolymer may have a density of 1.38-1.43 g/cm³.

In another aspect, the present disclosure provides a method for preparing the crosslinked, thermally rearranged poly(benzoxazole-co-imide) copolymer having a repeat unit represented by Chemical Formula 2, including:

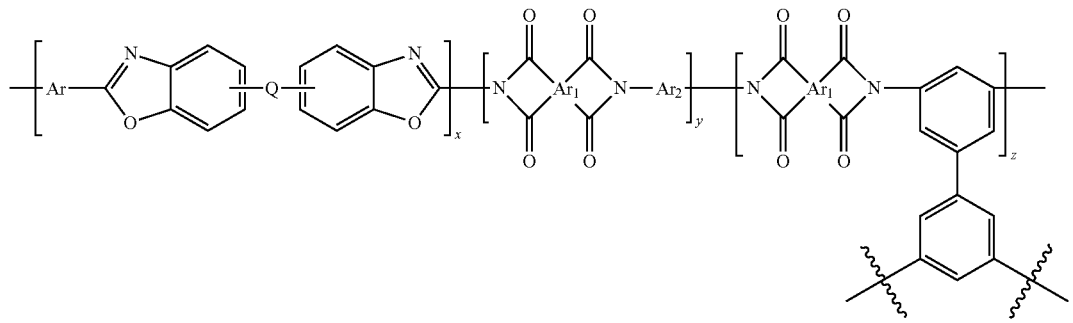

<Chemical Formula 2> wherein $Ar_1$ is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, I) obtaining a polyamic acid solution by reacting an acid dianhydride, an o-hydroxydiamine and an aromatic diamine and 3,5-diaminobenzoic acid, as comonomers, and synthesizing an o-hydroxypolyimide copolymer having carboxylic acid groups through azeotropic thermal imidization;

II) synthesizing a monoesterified o-hydroxypolyimide copolymer by reacting the polyimide copolymer of I) with a diol;

III) synthesizing a crosslinked o-hydroxypolyimide copolymer by transesterification crosslinking the monoesterified o-hydroxypolyimide copolymer of II); and IV) thermally rearranging the crosslinked o-hydroxypolyimide copolymer of III).

The acid dianhydride in I) may be represented by General Formula 3:

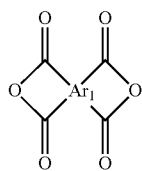

<Chemical Formula 3> wherein $Ar_1$ is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH.

The o-hydroxydiamine in I) may be represented by General Formula 2.

The aromatic diamine in I) may be represented by General Formula 4:

$H_2N$—$Ar_2$—$NH_2$         <General Formula 4> wherein $Ar_2$ is an aromatic ring group selected from a substituted or unsubstituted divalent $C_6$-$C_{24}$ arylene group and a substituted or unsubstituted divalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH.

The azeotropic thermal imidization in I) may be conducted by adding toluene or xylene to the polyamic acid solution and stirring the mixture at 180-200° C. for 6-12 hours.

The diol in II) may be selected from a group consisting of ethylene glycol, propylene glycol, 1,4-butylene glycol, 1,3-propanediol, 1,2-butanediol, 1,3-butanediol and benzenedimethanol.

The monoesterification in II) may be conducted by reacting the copolymer of I) with an excess diol corresponding to 50 or more equivalents of the carboxylic acid groups in the copolymer at 140-160° C. for 18-24 hours in the presence of a p-toluenesulfonic acid catalyst.

The transesterification crosslinking in III) may be conducted by heat-treating the copolymer at 200-250° C. for 18-24 hours in vacuo.

The thermal rearrangement in IV) may be conducted by raising temperature to 350-450° C. at a rate of 1-20° C./min under high-purity inert gas atmosphere and maintaining the temperature for 0.1-3 hours.

In another aspect, the present disclosure provides a gas separation membrane (a membrane for flue gas separation is excluded) containing the crosslinked, thermally rearranged poly(benzoxazole-co-imide) copolymer having a repeat unit represented by Chemical Formula 2.

In another aspect, the present disclosure provides a method for preparing the gas separation membrane (a membrane for flue gas separation is excluded), including:

a) obtaining a polyamic acid solution by reacting an acid dianhydride, an o-hydroxydiamine and an aromatic diamine and 3,5-diaminobenzoic acid, as comonomers, and synthesizing an o-hydroxypolyimide copolymer having carboxylic acid groups through azeotropic imidization;

b) preparing a membrane by dissolving the o-hydroxypolyimide copolymer having carboxylic acid groups synthesized in a) in an organic solvent and casting the same; and c) heat-treating the membrane obtained in b).

The acid dianhydride in a) may be represented by General Formula 3.

The o-hydroxydiamine in a) may be represented by General Formula 2.

The aromatic diamine in a) may be represented by General Formula 4.

The azeotropic thermal imidization in a) may be conducted by adding toluene or xylene to the polyamic acid solution and stirring the mixture at 180-200° C. for 6-12 hours.

The heat treatment in c) may be conducted by raising temperature to 350-450° C. at a rate of 1-20° C./min under high-purity inert gas atmosphere and maintaining the temperature for 0.1-3 hours.

The gas separation membrane (a membrane for flue gas separation is excluded) having a repeat unit represented by Chemical Formula 2 prepared by the method including a) through c) may have a d-spacing of 6.39-6.57 Å.

The gas separation membrane (a membrane for flue gas separation is excluded) having a repeat unit represented by Chemical Formula 2 prepared by the method including a) through c) may have a density of 1.38-1.41 $g/cm^3$.

Advantageous Effects

In accordance with the present disclosure, a crosslinked, thermally rearranged poly(benzoxazole-co-imide) copolymer membrane for gas separation (a membrane for flue gas separation is excluded)) can be prepared simply through heat treatment without requiring a complicated process such as chemical crosslinking, UV irradiation, etc. for forming a crosslinked structure and a gas separation membrane (a membrane for flue gas separation is excluded) prepared therefrom exhibits superior permeability and selectivity. Also, the method is applicable to commercial-scale production because the preparation process is simple.

In addition, the novel crosslinked, thermally rearranged poly(benzoxazole-co-imide) copolymer according to the present disclosure, which has a benzoxazole group content of less than 80% in the polymer chain, allows small molecules to penetrate and diffuse because the polymer chain is less packed and provides a larger space. Furthermore, since the gas separation membrane (a membrane for flue gas separation is excluded) containing the copolymer exhibits superior mechanical and thermal properties, decreased membrane area shrinkage and high gas permeability and selectivity, it exhibits excellent gas separation performance.

BEST MODE FOR CARRYING OUT INVENTION

Figure 1:
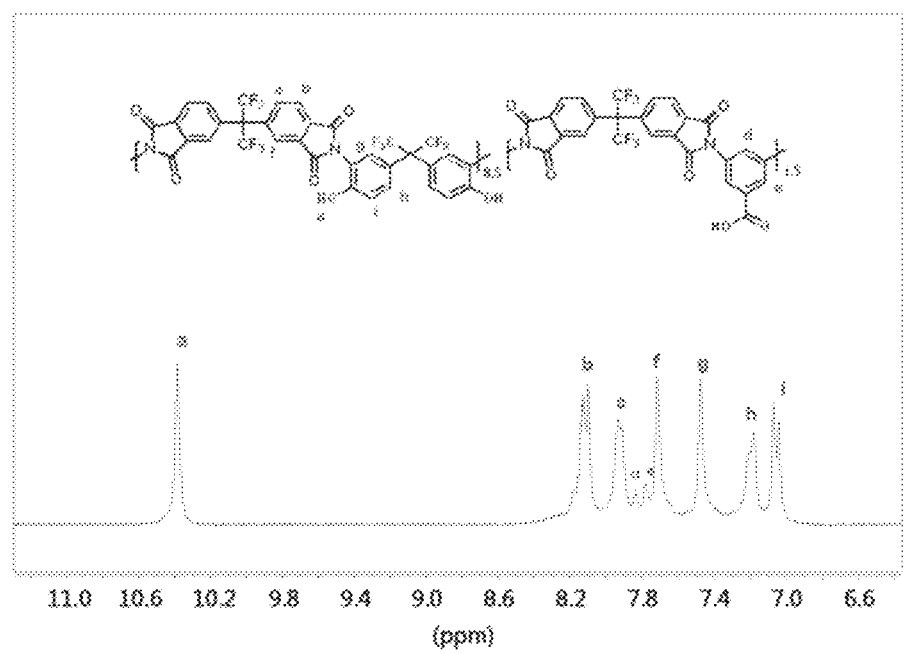
FIG. 1 shows a $^1$H-NMR spectrum of HPIDABA-15 synthesized according to Synthesis Example 4.

Flue gas refers to a gas emitted as a result of partial or complete combustion of hydrocarbon fuels. It contains carbon dioxide, water vapor and nitrogen and often contains one or more of hydrogen, oxygen and carbon monoxide as well as a small quantity of pollutants that may affect the global environment, including nitrogen oxides, sulfur oxides and particulate matter. The present disclosure provides a method for preparing a gas separation membrane excluding a membrane for separating the flue gas and a gas separation membrane excluding a membrane for flue gas separation prepared thereby.

A crosslinked, thermally rearranged poly(benzoxazole-co-imide) copolymer gas separation membrane prepared according to the present disclosure is based on synthesis of polyimide from imidization of polyamic acid obtained by reacting an acid dianhydride with a diamine. In order to form a crosslinked structure of polymer chains with heat treatment only, there should be functional groups such as carboxylic acid groups in the repeat unit. During the heat treatment, structural change from polyimide to polybenzoxazole occurs as the functional group such as a hydroxyl group at the ortho position of the aromatic imide ring attacks the carbonyl group of the imide ring to form a carboxy-benzoxazole intermediate and decarboxylation occurs through thermal rearrangement. As such, according to the present disclosure, a crosslinked, thermally rearranged poly (benzoxazole-co-imide) copolymer membrane for gas separation is prepared through a simple process.

That is to say, the present disclosure provides a method for preparing a crosslinked, thermally rearranged poly(benzoxazole-co-imide) copolymer membrane for gas separation (a membrane for flue gas separation is excluded), including:

i) obtaining a polyamic acid solution by reacting an acid dianhydride, an o-hydroxydiamine and 3,5-diaminobenzoic acid, as a comonomer, and synthesizing an o-hydroxypolyimide copolymer having carboxylic acid groups through azeotropic thermal imidization;

ii) preparing a membrane by dissolving the o-hydroxypolyimide copolymer having carboxylic acid groups synthesized in i) in an organic solvent and casting the same; and iii) heat-treating the membrane obtained in ii).

In general, to synthesize polyimide, polyamic acid has to be obtained by reacting an acid dianhydride with a diamine. In the present disclosure, a compound represented by General Formula 1 is used as the acid dianhydride.

<Chemical Formula 1>

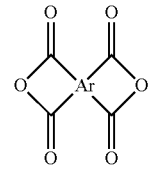

In General Formula 1, Ar is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH.

The acid dianhydride as a monomer for synthesizing polyimide is not particularly limited as long as it is one represented by General Formula 1. Specifically, 4,4'-(hexafluoroisopropylidene)diphthalic anhydride (6FDA) having fluorine groups may be used when considering that the thermal and chemical properties of the synthesized polyimide can be further improved.

And, in the present disclosure, in consideration of the fact that a polybenzoxazole unit can be introduced by thermally rearranging the o-hydroxypolyimide to obtain the poly(benzoxazole-co-imide) copolymer structure, a compound represented by General Formula 2 is used as an o-hydroxydiamine for synthesizing the o-hydroxypolyimide.

<General Formula 2>

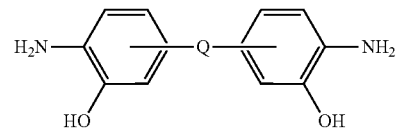

In General Formula 2, Q is a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$, CO—NH, $C(CH_3)(CF_3)$ or a substituted or unsubstituted phenylene group.

The o-hydroxydiamine is not particularly limited as long as it is one represented by General Formula 2. Specifically, 2,2-bis(3-amino-4-hydroxyphenyl)hexafluoropropane (bisAPAF) having fluorine groups may be used when considering that the thermal and chemical properties of the synthesized polyimide can be further improved.

In order to form a crosslinked structure of polymer chains with heat treatment only, without requiring a complicated process such as chemical crosslinking, UV irradiation, etc., there should be functional groups such as carboxylic acid groups in the repeat unit. Therefore, in the present disclosure, the o-hydroxypolyimide copolymer having carboxylic acid groups may be synthesized by reacting the acid dianhydride of General Formula 1 and the o-hydroxydiamine of General Formula 2 together with the 3,5-diaminobenzoic acid as a comonomer.

That is to say, in i), a polyamic acid solution is obtained by dissolving the acid dianhydride of General Formula 1, the o-hydroxydiamine of General Formula 2 and 3,5-diaminobenzoic acid in an organic solvent such as N-methylpyrrolidone (NMP) and stirring and then an o-hydroxypolyimide copolymer having carboxylic acid groups represented by Structural Formula 1 is synthesized through azeotropic thermal imidization.

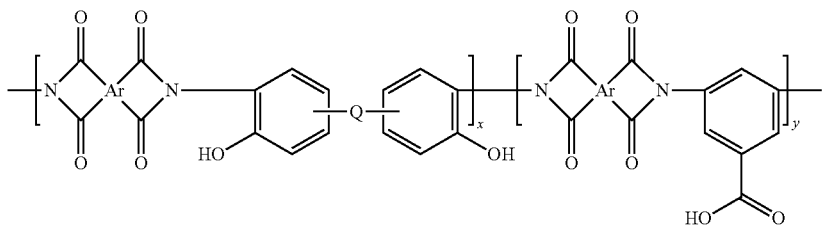

<Structural Formula 1>

In Structural Formula 1, Ar and Q are the same as defined in General Formulas 1 and 2 and x and y are molar fractions in the repeat unit, satisfying $0.75 \leq x \leq 0.975$, $0.025 \leq y \leq 0.25$ and $x+y=1$.

The azeotropic thermal imidization may be conducted by adding toluene or xylene to the polyamic acid solution and stirring the mixture at 180-200° C. for 6-12 hours. During the azeotropic thermal imidization, water released as an imide ring is formed is separated as an azeotropic mixture with the toluene or xylene.

Then, in ii), an o-hydroxypolyimide copolymer membrane having carboxylic acid groups is obtained by dissolving the o-hydroxypolyimide copolymer having carboxylic acid groups represented by Structural Formula 1 synthesized in i) in an organic solvent such as N-methylpryrrolidone (NMP) and casting the resulting polymer solution on a glass plate.

Finally, a crosslinked, thermally rearranged poly(benzoxazole-co-imide) copolymer membrane for gas separation having a repeat unit represented by Chemical Formula 1 is prepared as a final target product simply by heat-treating the membrane obtained in ii).

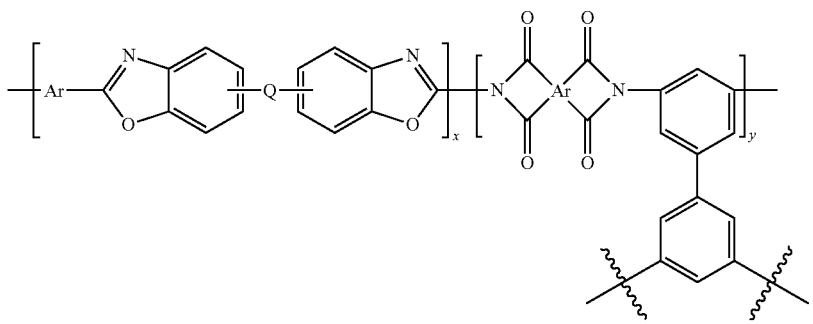

<Chemical Formula 1>

In Chemical Formula 1,

Ar is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, and x and y are molar fractions in the repeat unit, satisfying $0.75 \leq x \leq 0.975$, $0.025 \leq y \leq 0.25$ and $x+y=1$.

The heat treatment may be conducted by raising temperature to 350-450° C. at a rate of 1-20° C./min under high-purity inert gas atmosphere and maintaining the temperature for 0.1-3 hours.

The present disclosure also provides a crosslinked, thermally rearranged poly(benzoxazole-co-imide) copolymer having a repeat unit represented by Chemical Formula 2:

<Chemical Formula 2>

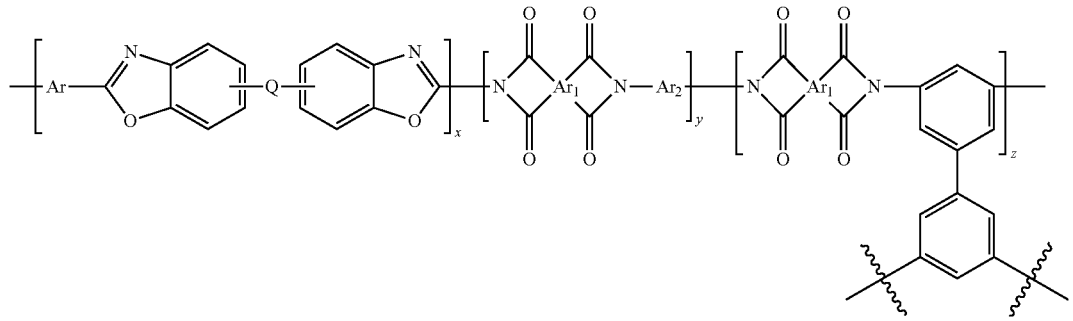

wherein

Ar$_1$ is an aromatic ring group selected from a substituted or unsubstituted tetravalent C$_6$-C$_{24}$ arylene group and a substituted or unsubstituted tetravalent C$_4$-C$_{24}$ heterocyclic ring group, wherein the aromatic ring group exists on its own, forms a condensed ring with each other, or is linked with each other by a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$ or CO—NH, Q is a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$, CO—NH, C(CH$_3$)(CF$_3$) or a substituted or unsubstituted phenylene group, Ar$_2$ is an aromatic ring group selected from a substituted or unsubstituted divalent C$_6$-C$_{24}$ arylene group and a substituted or unsubstituted divalent C$_4$-C$_{24}$ heterocyclic ring group, wherein the aromatic ring group exists on its own, forms a condensed ring with each other, or is linked with each other by a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$ or CO—NH, and x, y and z are molar fractions in the repeat unit, satisfying x<0.8 and x+y+z=1, except for the case where x, y or z is 0.

The poly(benzoxazole-co-imide) copolymer having a repeat unit represented by Chemical Formula 2 is based on synthesis of polyimide from imidization of polyamic acid obtained by reacting an acid dianhydride with a diamine. In order to form the covalently bonded crosslinked structure shown in Chemical Formula 2, a polyimide copolymer structure derived from a diamine compound having functional groups such as carboxylic acid groups is necessary. Structural change to thermally rearranged polybenzoxazole occurs as the functional group such as a hydroxyl group at the ortho position of the aromatic imide ring attacks the carbonyl group of the imide ring to form a carboxy-benzoxazole intermediate and decarboxylation occurs through heat treatment.

If the content of the benzoxazole groups in the polymer chain of the thermally rearranged poly(benzoxazole-co-imide) copolymer is 80% or higher, a membrane prepared therefrom may break easily and exhibit poor mechanical properties because it is too hard. Also, a large-area membrane may exhibit unsatisfactory gas permeability and selectivity owing to shrinkage caused by release of a large quantity of CO$_2$ during the thermal rearrangement. Therefore, in the present disclosure, the content of the benzoxazole groups in the polymer chain is decreased to less than 80%, more specifically 50% or below.

Accordingly, in the present disclosure, when synthesizing the o-hydroxypolyimide copolymer having carboxylic acid groups, which is a precursor to the thermally rearranged poly(benzoxazole-co-imide) copolymer, an inexpensive aromatic diamine is used as a comonomer to synthesize a terpolymer precursor wherein a new polyimide structural unit is introduced into the polymer chain, so that the content of the benzoxazole groups in the polymer chain of the target product, or the thermally rearranged poly(benzoxazole-co-imide) copolymer, is less than 80%. As a result, a crosslinked, thermally rearranged poly(benzoxazole-co-imide) copolymer having a repeat unit represented by Chemical Formula 2, wherein the content of the benzoxazole groups in the polymer chain is less than 80%, is prepared following a multi-step synthetic route as described below.

That is to say, the present disclosure provides a method for preparing the crosslinked, thermally rearranged poly(benzoxazole-co-imide) copolymer having a repeat unit represented by Chemical Formula 2, including:

I) obtaining a polyamic acid solution by reacting an acid dianhydride, an o-hydroxydiamine and an aromatic diamine and 3,5-diaminobenzoic acid, as comonomers, and synthesizing an o-hydroxypolyimide copolymer having carboxylic acid groups through azeotropic thermal imidization;

II) synthesizing a monoesterified o-hydroxypolyimide copolymer by reacting the polyimide copolymer of I) with a diol;

III) synthesizing a crosslinked o-hydroxypolyimide copolymer by transesterification crosslinking the monoesterified o-hydroxypolyimide copolymer of II); and IV) thermally rearranging the crosslinked o-hydroxypolyimide copolymer of III).

In general, to synthesize polyimide, polyamic acid has to be obtained by reacting an acid dianhydride with a diamine. In the present disclosure, a compound represented by General Formula 3 is used as the acid dianhydride.

<Chemical Formula 3>

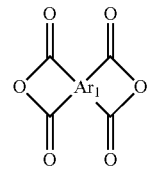

In General Formula 3, Ar$_1$ is an aromatic ring group selected from a substituted or unsubstituted tetravalent C$_6$-C$_{24}$ arylene group and a substituted or unsubstituted tetravalent C$_4$-C$_{24}$ heterocyclic ring group, wherein the aromatic ring group exists on its own, forms a condensed ring with each other, or is linked with each other by a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$ or CO—NH.

The acid dianhydride as a monomer for synthesizing polyimide is not particularly limited as long as it is one represented by General Formula 3. Specifically, 4,4'-(hexafluoroisopropylidene)diphthalic anhydride (6FDA) having fluorine groups may be used when considering that the thermal and chemical properties of the synthesized polyimide can be further improved.

And, in the present disclosure, in consideration of the fact that a polybenzoxazole unit can be introduced by thermally rearranging the o-hydroxypolyimide to obtain the poly(benzoxazole-co-imide) copolymer structure, a compound represented by General Formula 2 is used as an o-hydroxydiamine for synthesizing the o-hydroxypolyimide.

<General Formula 2>

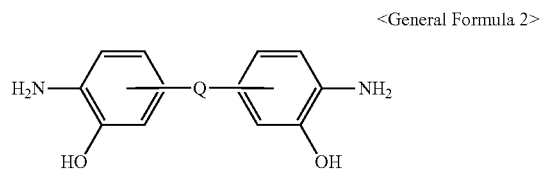

In General Formula 2, Q is a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$, CO—NH, C(CH$_3$)(CF$_3$) or a substituted or unsubstituted phenylene group.

The o-hydroxydiamine is not particularly limited as long as it is one represented by General Formula 2. Specifically, 3,3-dihydroxybenzidine (HAB) may be used when considering the easiness of reaction.

And, in the present disclosure, an aromatic diamine represented by General Formula 4 is used as a comonomer and reacted with the acid dianhydride of General Formula 3 to introduce a polyimide structural unit into the copolymer.

H$_2$N—Ar$_2$—NH$_2$    <General Formula 4>

In General Formula 4, Ar$_2$ is an aromatic ring group selected from a substituted or unsubstituted divalent C$_6$-C$_{24}$ arylene group and a substituted or unsubstituted divalent C$_4$-C$_{24}$ heterocyclic ring group, wherein the aromatic ring group exists on its own, forms a condensed ring with each other, or is linked with each other by a single bond, O, S, CO, SO$_2$, Si(CH$_3$)$_2$, (CH$_2$)$_p$ (1≤p≤10), (CF$_2$)$_q$ (1≤q≤10), C(CH$_3$)$_2$, C(CF$_3$)$_2$ or CO—NH.

The aromatic diamine is not particularly limited as long as it is one represented by General Formula 4. Specifically, an inexpensive one may be used when considering the cost of large-scale production. More specifically, 2,4,6-trimethylphenylenediamine (DAM) may be used.

In addition, since there should be functional groups such as carboxylic acid groups in the repeat unit to provide a covalently bonded crosslinked structure, in the present disclosure, 3,5-diaminobenzoic acid (DABA) is used as another comonomer and reacted with the acid dianhydride of General Formula 3 to introduce another polyimide structural unit having carboxylic acid groups into the copolymer.

Accordingly, in I), a terpolymer having a repeat unit consisting of an o-hydroxypolyimide structural unit, a polyimide structural unit and a polyimide structural unit having carboxylic acid groups may be synthesized by reacting the acid dianhydride of General Formula 3, the o-hydroxydiamine of General Formula 2 and the aromatic diamine of General Formula 4 and 3,5-diaminobenzoic acid (DABA), as comonomers, and, as a result, the content of the o-hydroxypolyimide structural unit, which is thermally rearrange to polybenzoxazole in the following heat treatment process, may be controlled to less than 80%.

That is to say, in I), a polyamic acid solution is obtained by dissolving the acid dianhydride of General Formula 3, the o-hydroxydiamine of General Formula 2, the aromatic diamine of General Formula 4 and 3,5-diaminobenzoic acid (DABA) in an organic solvent such as N-methylpryrrolidone (NMP) and stirring and then an o-hydroxypolyimide copolymer having carboxylic acid groups represented by Structural Formula 2 is synthesized through azeotropic thermal imidization.

<Structural Formula 2>

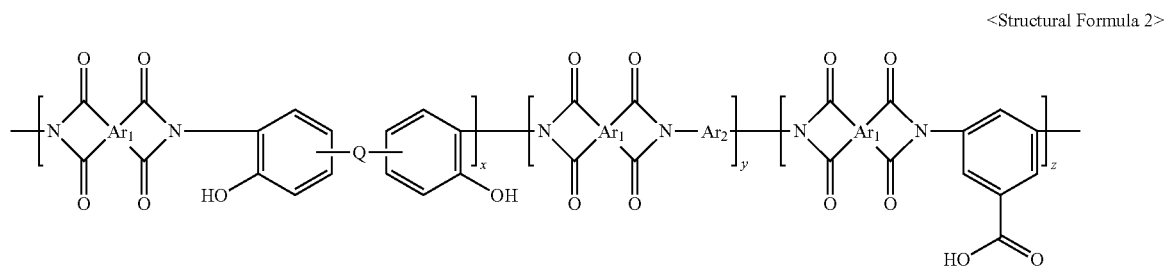

In Structural Formula 2, Ar$_1$, Ar$_2$ and Q are the same as defined in General Formulas 3, 4 and 2 and x, y and z are molar fractions in the repeat unit, satisfying x<0.8 and x+y+z=1, except for the case where x, y or z is 0.

The azeotropic thermal imidization may be conducted by adding toluene or xylene to the polyamic acid solution and stirring the mixture at 180-200° C. for 6-12 hours. During the azeotropic thermal imidization, water released as an imide ring is formed is separated as an azeotropic mixture with the toluene or xylene.

Then, a monoesterified o-hydroxypolyimide copolymer represented by Structural Formula 3 is synthesized by reacting the polyimide copolymer of I) with a diol.

<Structural Formula 3>

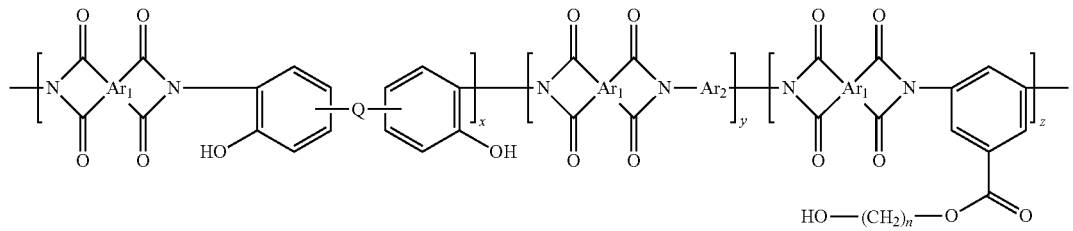

In Structural Formula 3, $Ar_1$, Q, $Ar_2$, x, y and z are the same as defined in Structural Formula 2.

The diol may be selected from a group consisting of ethylene glycol, propylene glycol, 1,4-butylene glycol, 1,3-propanediol, 1,2-butanediol, 1,3-butanediol and benzenedimethanol. More specifically, 1,4-butylene glycol may be used, although not being limited thereto.

The monoesterification in II) may be conducted by reacting the polyimide copolymer represented by Structural Formula 2 with an excess diol corresponding to 50 or more equivalents of the carboxylic acid groups in the copolymer at 140-160° C. for 18-24 hours in the presence of a p-toluenesulfonic acid catalyst.

Then, a crosslinked o-hydroxypolyimide copolymer represented by Structural Formula 4 is synthesized by transesterification crosslinking the monoesterified o-hydroxypolyimide copolymer represented by Structural Formula 3 of II).

Through the preparation process of I)-IV), a film-type copolymer is obtained. Accordingly, the present disclosure also provides a gas separation membrane (a membrane for flue gas separation is excluded) containing the crosslinked, thermally rearranged poly(benzoxazole-co-imide) copolymer having a repeat unit represented by Chemical Formula 2.

In addition, the present disclosure provides a method for preparing a gas separation membrane (a membrane for flue gas separation is excluded) containing the crosslinked, thermally rearranged poly(benzoxazole-co-imide) copolymer having a repeat unit represented by Chemical Formula 2 simply through heat treatment without requiring a complicated process such as chemical crosslinking, UV irradiation, etc.

That is to say, the present disclosure provides a method for preparing a gas separation membrane (a membrane for <Structural Formula 4>

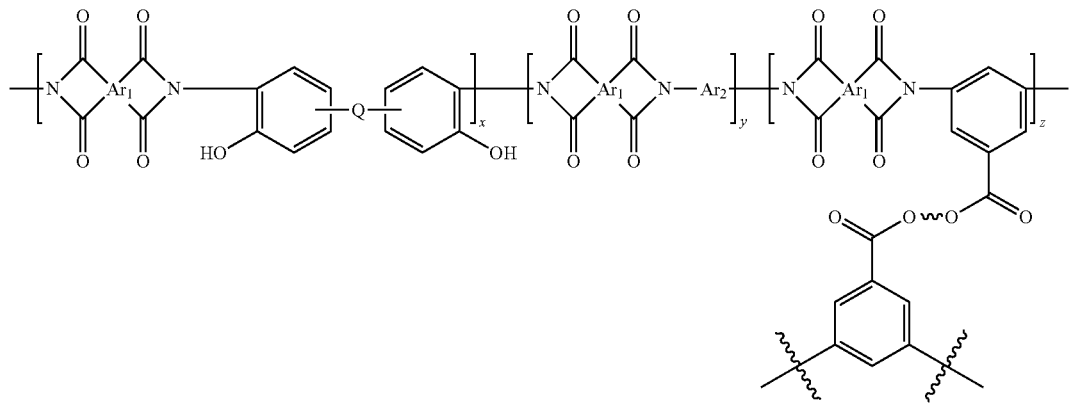

In Structural Formula 4, $Ar_1$, Q, $Ar_e$, x, y and z are the same as defined in Structural Formula 2.

The transesterification crosslinking may be conducted by heat-treating the copolymer at 200-250° C. for 18-24 hours in vacuo.

Finally, a crosslinked, thermally rearranged poly(benzoxazole-co-imide) copolymer having a repeat unit represented by Chemical Formula 2 is prepared as a final target product simply by thermally rearranging the crosslinked o-hydroxypolyimide copolymer represented by Structural Formula 4 of III).

The thermal rearrangement may be conducted by raising temperature to 350-450° C. at a rate of 1-20° C./min under high-purity inert gas atmosphere and maintaining the temperature for 0.1-3 hours.

flue gas separation is excluded) containing a crosslinked, thermally rearranged poly(benzoxazole-co-imide) copolymer having a repeat unit represented by Chemical Formula 2, including:

a) obtaining a polyamic acid solution by reacting an acid dianhydride, an o-hydroxydiamine and an aromatic diamine and 3,5-diaminobenzoic acid, as comonomers, and synthesizing an o-hydroxypolyimide copolymer having carboxylic acid groups through azeotropic imidization;

b) preparing a membrane by dissolving the o-hydroxypolyimide copolymer having carboxylic acid groups synthesized in a) in an organic solvent and casting the same; and c) heat-treating the membrane obtained in b).

In general, to synthesize polyimide, polyamic acid has to be obtained by reacting an acid dianhydride with a diamine.

In the present disclosure, a compound represented by General Formula 3 is used as the acid dianhydride.

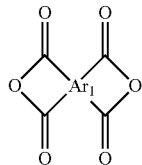

<Chemical Formula 3>

In General Formula 3, $Ar_1$ is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH.

The acid dianhydride as a monomer for synthesizing polyimide is not particularly limited as long as it is one represented by General Formula 3. Specifically, 4,4'-(hexafluoroisopropylidene)diphthalic anhydride (6FDA) having fluorine groups may be used when considering that the thermal and chemical properties of the synthesized polyimide can be further improved.

And, in the present disclosure, in consideration of the fact that a polybenzoxazole unit can be introduced by thermally rearranging the o-hydroxypolyimide to obtain the poly(benzoxazole-co-imide) copolymer structure, a compound represented by General Formula 2 is used as an o-hydroxydiamine for synthesizing the o-hydroxypolyimide.

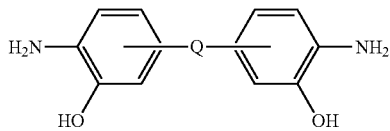

<General Formula 2>

In General Formula 2, Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group.

The o-hydroxydiamine is not particularly limited as long as it is one represented by General Formula 2. Specifically, 3,3-dihydroxybenzidine (HAB) may be used when considering the easiness of reaction.

And, in the present disclosure, an aromatic diamine represented by General Formula 4 is used as a comonomer and reacted with the acid dianhydride of General Formula 3 to introduce a polyimide structural unit into the copolymer.

$$H_2N—Ar_2—NH_2$$ <General Formula 4>

In General Formula 4, $Ar_2$ is an aromatic ring group selected from a substituted or unsubstituted divalent $C_6$-$C_{24}$ arylene group and a substituted or unsubstituted divalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH.

The aromatic diamine is not particularly limited as long as it is one represented by General Formula 4. Specifically, an inexpensive one may be used when considering the cost of large-scale production. More specifically, 2,4,6-trimethylphenylenediamine (DAM) may be used.

In order to form a crosslinked structure of polymer chains with heat treatment only, without requiring a complicated process such as chemical crosslinking, UV irradiation, etc., there should be functional groups such as carboxylic acid groups in the repeat unit. Therefore, in the present disclosure, 3,5-diaminobenzoic acid (DABA) is used as another comonomer and reacted with the acid dianhydride of General Formula 3 to introduce another polyimide structural unit having carboxylic acid groups into the copolymer.

Accordingly, in a), a terpolymer having a repeat unit consisting of an o-hydroxypolyimide structural unit, a polyimide structural unit and a polyimide structural unit having carboxylic acid groups may be synthesized by reacting the acid dianhydride of General Formula 3, the o-hydroxydiamine of General Formula 2 and the aromatic diamine of General Formula 4 and 3,5-diaminobenzoic acid (DABA), as comonomers, and, as a result, the content of the o-hydroxypolyimide structural unit, which is thermally rearrange to polybenzoxazole in the following heat treatment process, may be controlled to less than 80%.

That is to say, in a), a polyamic acid solution is obtained by dissolving the acid dianhydride of General Formula 3, the o-hydroxydiamine of General Formula 2, the aromatic diamine of General Formula 4 and 3,5-diaminobenzoic acid (DABA) in an organic solvent such as N-methylpryrrolidone (NMP) and stirring and then an o-hydroxypolyimide copolymer having carboxylic acid groups represented by Structural Formula 2 is synthesized through azeotropic thermal imidization.

<Structural Formula 2>

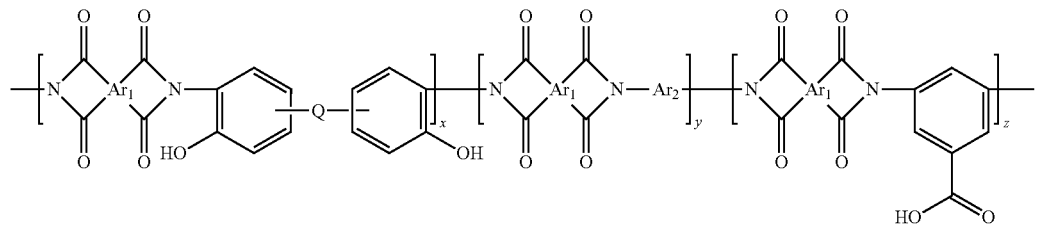

In Structural Formula 2, $Ar_1$, $Ar_e$ and Q are the same as defined in General Formulas 3, 4 and 2 and x, y and z are molar fractions in the repeat unit, satisfying x<0.8 and x+y+z=1, except for the case where x, y or z is 0.

The azeotropic thermal imidization may be conducted by adding toluene or xylene to the polyamic acid solution and stirring the mixture at 180-200° C. for 6-12 hours. During the azeotropic thermal imidization, water released as an imide ring is formed is separated as an azeotropic mixture with the toluene or xylene.

Then, in b), an o-hydroxypolyimide copolymer membrane having carboxylic acid groups is obtained by dissolving the o-hydroxypolyimide copolymer having carboxylic acid groups represented by Structural Formula 2 of a) in an organic solvent such as N-methylpryrrolidone (NMP) and casting the resulting polymer solution on a glass plate.

Finally, a gas separation membrane (a membrane for flue gas separation is excluded) containing the crosslinked, thermally rearranged poly(benzoxazole-co-imide) copolymer having a repeat unit represented by Chemical Formula 2 is prepared as a final target product simply by heat-treating the membrane obtained in b).

The heat treatment may be conducted by raising temperature to 350-450° C. at a rate of 1-20° C./min under high-purity inert gas atmosphere and maintaining the temperature for 0.1-3 hours.

Hereinafter, examples for preparing the crosslinked, thermally rearranged poly(benzoxazole-co-imide) copolymer membrane for gas separation (a membrane for flue gas separation is excluded), the crosslinked, thermally rearranged poly(benzoxazole-co-imide) copolymer having a repeat unit represented by Chemical Formula 2 wherein the content of the benzoxazole groups in the polymer chain is less than 80% and the gas separation membrane (a membrane for flue gas separation is excluded) containing the same according to the present disclosure are described in detail referring to the attached drawings.

[Synthesis Example 1] Synthesis of o-hydroxypolyimide Copolymer Having Carboxylic Acid Groups 9.75 mmol of 2,2-bis(3-amino-4-hydroxyphenyl)hexafluoropropane (bisAPAF) and 0.25 mmol of 3,5-diaminobenzoic acid (DABA) were dissolved in 10 mL of anhydrous NMP. After cooling to 0° C., 10 mmol of 4,4'-(hexafluoroisopropylidene)diphthalic anhydride (6FDA) dissolved in 10 mL of anhydrous NMP was added thereto. The reaction mixture was stirred at 0° C. for 15 minutes and then was allowed to stand at room temperature overnight to obtain a viscous polyamic acid solution. Subsequently, after adding 20 mL of o-xylene to the polyamic acid solution, imidization was conducted by heating the mixture 180° C. for 6 hours while stirring vigorously. During the process, water released as an imide ring was formed was separated as an azeotropic mixture with xylene. The obtained brown solution was cooled to room temperature, added to distilled water, washed several times with warm water and dried in a convection oven at 120° C. for 12 hours to synthesize an o-hydroxypolyimide copolymer having carboxylic acid groups represented by Chemical Formula 3, which was named as HPIDABA-2.5.

In Chemical Formula 3 x and y are molar fractions in the repeat unit, satisfying x=0.975 and y=0.025.

The synthesis of the o-hydroxypolyimide copolymer having carboxylic acid groups represented by Chemical Formula 3 in Synthesis Example 1 was confirmed by the following $^1$H-NMR and FT-IR data.

$^1$H-NMR (300 MHz, DMSO-d$_6$, ppm): 13.50 (s, —COOH), 10.41 (s, —OH), 8.10 (d, H$_{ar}$, J=8.0 Hz), 7.92 (d, H$_{ar}$, J=8.0 Hz), 7.85 (s, H$_{ar}$), 7.80 (s, H$_{ar}$), 7.71 (s, H$_{ar}$), 7.47 (s, H$_{ar}$), 7.20 (d, H$_{ar}$, J=8.3 Hz), 7.04 (d, H$_{ar}$, J=8.3 Hz). FT-IR (film): ν (O—H) at 3400 cm$^{-1}$, ν (C=O) at 1786 and 1716 cm$^{-1}$, Ar (C—C) at 1619, 1519 cm$^{-1}$, imide ν (C—N) at 1377 cm$^{-1}$, (C—F) at 1299-1135 cm$^{-1}$, imide (C—N—C) at 1102 and 720 cm$^{-1}$.

[Synthesis Examples 2-6] Synthesis of o-hydroxypolyimide Copolymers Having Carboxylic Acid Groups 9.5 mmol, 9.0 mmol, 8.5 mmol, 8.0 mmol or 7.5 mmol of bisAPAF and 0.5 mmol, 1.0 mmol, 1.5 mmol, 2.0 mmol or 2.5 mmol of DABA was used to synthesize o-hydroxypolyimide copolymers having carboxylic acid groups with different molar fractions x and y in the repeat unit, which were named as HPIDABA-Y (Y is the molar fraction (percent) of the diamine DABA introduced into the repeat unit; Y=5, 10, 15, 20, 25).

[Membrane Preparation Examples 1-6] Preparation of o-hydroxypolyimide Copolymer Membranes Having Carboxylic Acid Groups A 15 wt % solution was prepared by dissolving the HPIDABA-Y (Y=2.5, 5, 10, 15, 20, 25) synthesized in Synthesis Examples 1-6 in NMP and casted on a glass plate. Then, o-hydroxypolyimide copolymer membranes having carboxylic acid groups were obtained by evaporating remaining NMP and drying in a vacuum oven at 100° C., 150° C., 200° C. and 250° C. for an hour, respectively, which were named in the same manner as in Synthesis Examples 1-6.

[Examples 1-6] Preparation of Crosslinked, Thermally Rearranged poly(benzoxazole-co-imide) Copolymer Membranes A defectless film obtained in Membrane Preparation Examples 1-6 was cut to a size of 3 cm×3 cm and placed between quartz plates to prevent film damage due to temperature increase in a muffle furnace. The sample was heated to 450° C. at a rate of 5° C./min under high-purity argon gas atmosphere and maintained at the temperature for 1 hour. After the heat treatment, the muffle furnace was slowly cooled to room temperature at a rate lower than 10° C./min to prepare a crosslinked, thermally rearranged poly(benzo- <Chemical Formula 3>

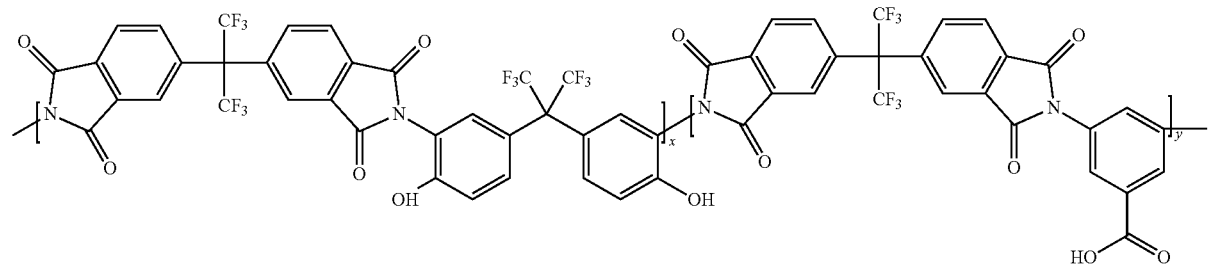

xazole-co-imide) copolymer membrane represented by Chemical Formula 4, which was named as PBODABA-Y (Y=2.5, 5, 10, 15, 20, 25).

heat-treating the HPIMPD-5 obtained in Reference Example 2 in the same manner as in Example 1 and was named as PBOMPD-5.

<Chemical Formula 4>

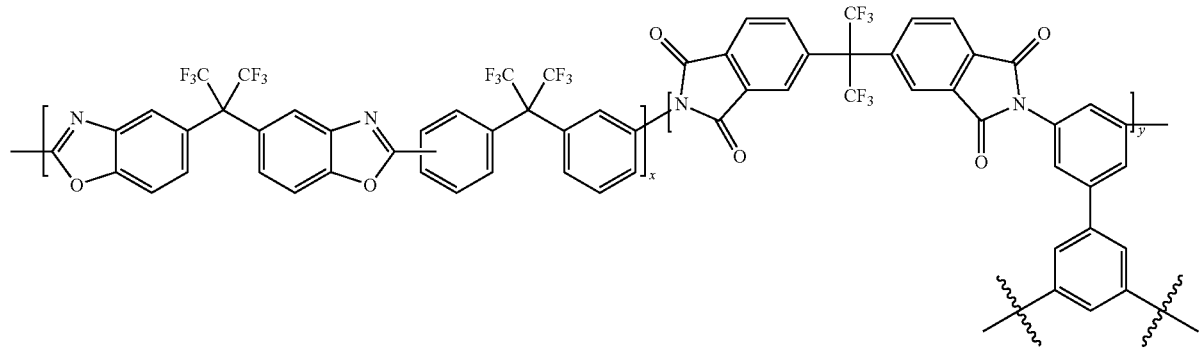

In Chemical Formula 4, x=0.975, 0.95, 0.9, 0.85, 0.8 or 0.75 and y=0.025, 0.05, 0.1, 0.15, 0.2 or 0.25.

[Reference Example 1] Preparation of o-hydroxypolyimide Homopolymer Membrane not Having Carboxylic Acid Groups An o-hydroxypolyimide homopolymer not having carboxylic acid groups was synthesized in the same manner as in Synthesis Example 1, except that only 10 mmol of bisAPAF and 10 mmol of 6FDA were used as reactants without using DABA. Then, a membrane was prepared according to Membrane Preparation Example 1 and was named as HPI.

[Reference Example 2] Preparation of o-hydroxypolyimide Copolymer Membrane not Having Carboxylic Acid Groups An o-hydroxypolyimide copolymer not having carboxylic acid groups was synthesized in the same manner as in Synthesis Example 1, except that only 9.5 mmol of bisA-PAF, 0.5 mmol of m-phenylenediamine and 10 mmol of 6FDA were used as reactants without using DABA. Then, a membrane was prepared according to Membrane Preparation Example 1 and was named as HPIMPD-5.

[Synthesis Example 7] Synthesis of o-hydroxypolyimide Copolymer Having Carboxylic Acid Groups 5.0 mmol of 3,3-dihydroxybenzidine (HAB), 4.5 mmol of 2,4,6-trimethylphenylenediamine (DAM) and 0.5 mmol of 3,5-diaminobenzoic acid (DABA) were dissolved in 10 mL of anhydrous NMP. After cooling to 0° C., 10 mmol of 4,4'-(hexafluoroisopropylidene)diphthalic anhydride (6FDA) dissolved in 10 mL of anhydrous NMP was added thereto. The reaction mixture was stirred at 0° C. for 15 minutes and then was allowed to stand at room temperature overnight to obtain a viscous polyamic acid solution. Subsequently, after adding 20 mL of o-xylene to the polyamic acid solution, imidization was conducted by heating the mixture 180° C. for 6 hours while stirring vigorously. During the process, water released as an imide ring was formed was separated as an azeotropic mixture with xylene. The obtained brown solution was cooled to room temperature, added to distilled water, washed several times with warm water and dried in a convection oven at 120° C. for 12 hours to synthesize an o-hydroxypolyimide copolymer having carboxylic acid groups represented by Chemical Formula 5.

<Chemical Formula 5>

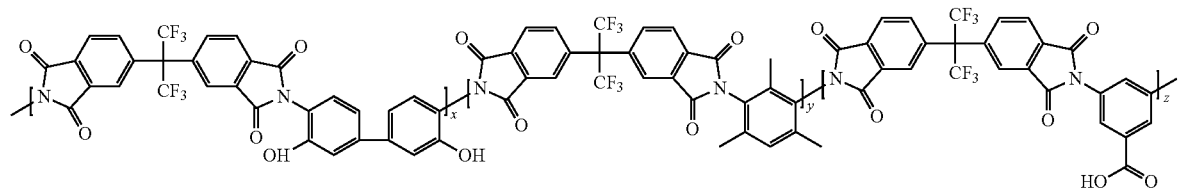

[Comparative Example 1] Preparation of Uncrosslinked, Thermally Rearranged poly(benzoxazole-co-imide) Copolymer Membrane An uncrosslinked, thermally rearranged poly(benzoxazole-co-imide) copolymer membrane was prepared by In Chemical Formula 5, x, y and z are molar fractions in the repeat unit, satisfying x=0.5, y=0.45 and z=0.05.

The synthesis of the o-hydroxypolyimide copolymer having carboxylic acid groups represented by Chemical Formula 5 in Synthesis Example 7 was confirmed by the following FT-IR data.

ν (O—H) at 3460 cm⁻¹, (C—H) at 2920 and 2980 cm⁻¹, ν (C=O) at 1784 and 1725 cm⁻¹, Ar (C—C) at 1619 and 1573 cm⁻¹, imide ν (C—N) at 1359 cm⁻¹, (C—F) at 1295-1140 cm⁻¹, imide (C—N—C) at 1099 cm⁻¹.

[Synthesis Examples 8-11] Synthesis of o-hydroxypolyimide Copolymers Having Carboxylic Acid Groups o-hydroxypolyimide copolymer having carboxylic acid groups were synthesized in the same manner as in Synthesis Example 7, except that the amount (mmol) of the reactants HAB, DAM and DABA was varied as described in Table 1 to change the molar fractions x, y and z in the repeat unit variously.

TABLE 1

|  | HAB | DAM | DABA | x | y | z |
|---|---|---|---|---|---|---|
| Synthesis Example 8 | 5.0 | 4.0 | 1.0 | 0.5 | 0.4 | 0.1 |
| Synthesis Example 9 | 5.0 | 3.0 | 2.0 | 0.5 | 0.3 | 0.2 |
| Synthesis Example 10 | 4.5 | 5.0 | 0.5 | 0.45 | 0.5 | 0.05 |

TABLE 1-continued

|  | HAB | DAM | DABA | x | y | z |
|---|---|---|---|---|---|---|
| Synthesis Example 11 | 4.0 | 5.5 | 0.5 | 0.4 | 0.55 | 0.05 |

[Synthesis Examples 12-16] Synthesis of Monoesterified o-hydroxypolyimide Copolymers 1.0 g of the o-hydroxypolyimide copolymer having carboxylic acid groups obtained in Synthesis Examples 7-11 was dissolved in 10 mL of NMP in a 3-bulb flask equipped with a condenser while continuously purging with nitrogen. Excess 1,4-butylene glycol corresponding to 50 or more equivalents of the carboxylic acid groups was added to the resulting solution. Subsequently, after adding 5 mg of a p-toluenesulfonic acid catalyst under nitrogen atmosphere, monoesterification was conducted at 140° C. for 18 hours. After the monoesterification was completed, the resulting copolymer solution was cooled to room temperature, added to distilled water, washed several times to remove unreacted 1,4-butylene glycol and dried in a vacuum oven at 70° C. for 24 hours to synthesize a monoesterified o-hydroxypolyimide copolymer represented by Chemical Formula 6.

<Chemical Formula 6>

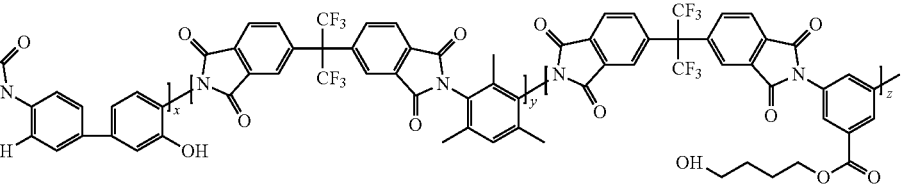

In Chemical Formula 6 x, y and z are the same as defined in Synthesis Examples 7-11.

[Synthesis Examples 17-21] Synthesis of Crosslinked o-hydroxypolyimide Copolymers (Membranes)

A 15 wt % solution was prepared by dissolving the monoesterified o-hydroxypolyimide copolymer obtained in Synthesis Examples 12-16 in NMP, casted on a glass plate and maintained in a vacuum oven at 100° C., 150° C., 200° C. and 250° C. for an hour, respectively, to evaporate NMP and then slowly heated to 250° C. Then, crosslinked o-hydroxypolyimide copolymers represented by Chemical Formula 7 were synthesized by conducting transesterification crosslinking by heat-treating the resulting copolymer films at 250° C. for 24 hours in vacuo.

<Chemical Formula 7>

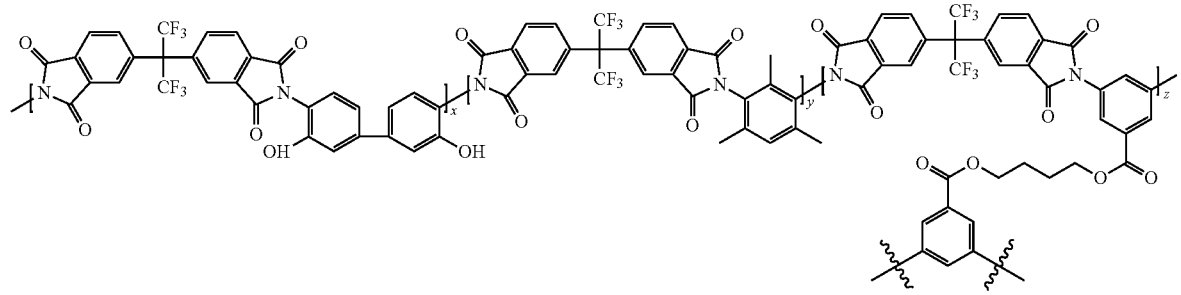

In Chemical Formula 7 x, y and z are the same as defined in Chemical Formula 6.

The synthesis of the crosslinked o-hydroxypolyimide copolymers represented by Chemical Formula 7 in Synthesis Examples 17-21 was confirmed by the following FT-IR data.

ν (O—H) at 3465 cm$^{-1}$, (C—H) at 2950 and 2970 cm$^{-1}$, ν (C=O) at 1789 and 1712 cm$^{-1}$, Ar (C—C) at 1619 and 1573 cm$^{-1}$, imide ν (C—N) at 1362 cm$^{-1}$, (C—F) at 1295-1140 cm$^{-1}$, imide (C—N—C) at 1097 cm$^{-1}$.

[Examples 7-11] Preparation of Crosslinked, Thermally Rearranged poly(benzoxazole-co-imide) Copolymers (Membranes)

A defectless film obtained in Synthesis Examples 17-21 was cut to a size of 3 cm×3 cm and placed between quartz plates to prevent film damage due to temperature increase in a muffle furnace. The sample was heated to 450° C. at a rate of 5° C./min under high-purity argon gas atmosphere and maintained at the temperature for 1 hour. After the heat treatment, the muffle furnace was slowly cooled to room temperature at a rate lower than 10° C./min to prepare a crosslinked, thermally rearranged poly(benzoxazole-co-imide) copolymer represented by Chemical Formula 8.

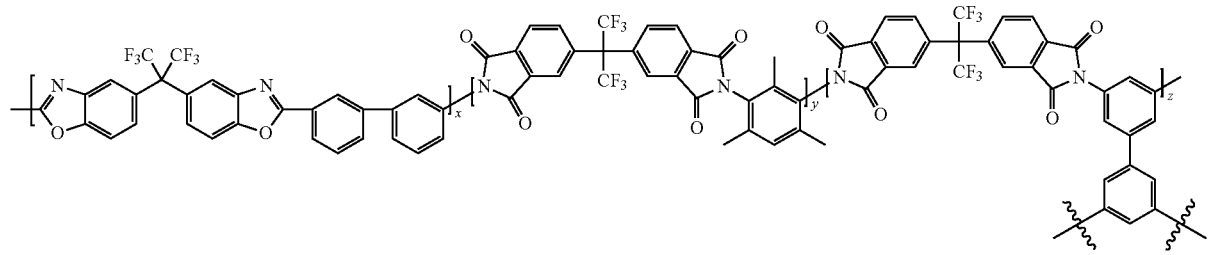

<Chemical Formula 8>

In Chemical Formula 8, x, y and z are the same as defined in Chemical Formula 6.

The synthesis of the crosslinked, thermally rearranged poly(benzoxazole-co-imide) copolymer represented by Chemical Formula 8 in Examples 7-11 was confirmed by the following FT-IR data.

ν (O—H) at 3507 cm$^{-1}$, (C—H) at 2920 and 2980 cm$^{-1}$, ν (C=O) at 1784 and 1725 cm$^{-1}$, Ar (C—C) at 1619 and 1598 cm$^{-1}$, imide ν (C—N) at 1359 cm$^{-1}$, (C—F) at 1295-1140 cm$^{-1}$, imide (C—N—C) at 1099 cm$^{-1}$, benzoxazole (C=N) at 1550 cm$^{-1}$, benzoxazole (C—O) at 1062 cm$^{-1}$.

[Examples 12-16] Preparation of Crosslinked, Thermally Rearranged poly(benzoxazole-co-imide) Copolymers (Membranes)

A 15 wt % solution was prepared by dissolving the o-hydroxypolyimide copolymer having carboxylic acid groups synthesized in Synthesis Examples 7-11 in NMP and casted on a glass plate. Then, o-hydroxypolyimide copolymer membranes having carboxylic acid groups were obtained by evaporating remaining NMP and drying in a vacuum oven at 100° C., 150° C. and 200° C. for an hour, respectively, which were then heat-treated in the same manner as in Examples 7-11 to prepare crosslinked, thermally rearranged poly(benzoxazole-co-imide) copolymers (membranes).

[Comparative Example 2] Preparation of Uncrosslinked, Thermally Rearranged poly(benzoxazole-co-imide) Copolymer (Membrane)

An uncrosslinked, thermally rearranged poly(benzoxazole-co-imide) copolymer represented by Chemical Formula 9 was prepared according to the same procedures of Synthesis Examples 7, 12 and 17, using 5 mmol of HAB, 5 mmol of DAM and 10 mmol of 6FDA and not using the comonomer DABA.

<Chemical Formula 9>

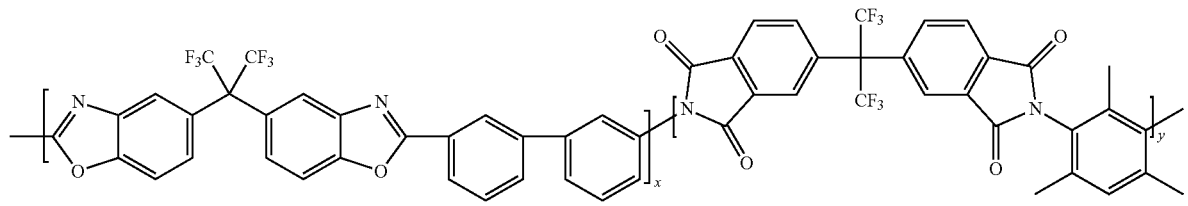

In Chemical Formula 9, x=0.5 and y=0.5.

[Comparative Example 3] Preparation of Crosslinked, Thermally Rearranged poly(benzoxazole-co-imide) Copolymer (Membrane) Lacking Polyimide Structural Unit Derived from Aromatic Diamine A crosslinked, thermally rearranged poly(benzoxazole-co-imide) copolymer lacking a polyimide structural unit derived from an aromatic diamine, represented by Chemical Formula 10, was prepared according to the same procedures of Synthesis Examples 7, 12 and 17, using 9.5 mmol of 2,2-bis(3-amino-4-hydroxyphenyl)hexafluoropropane (bisAPAF) as o-hydroxydiamine, 0.5 mmol of DABA and 10 mmol of 6FDA and not using the comonomer DABA.

C—F absorption peak at 1299-1135 $cm^{-1}$ and the imide C—N—C absorption peak around 1102 $cm^{-1}$ confirm the synthesis of the o-hydroxypolyimide copolymer having carboxylic acid groups.

Figure 3:
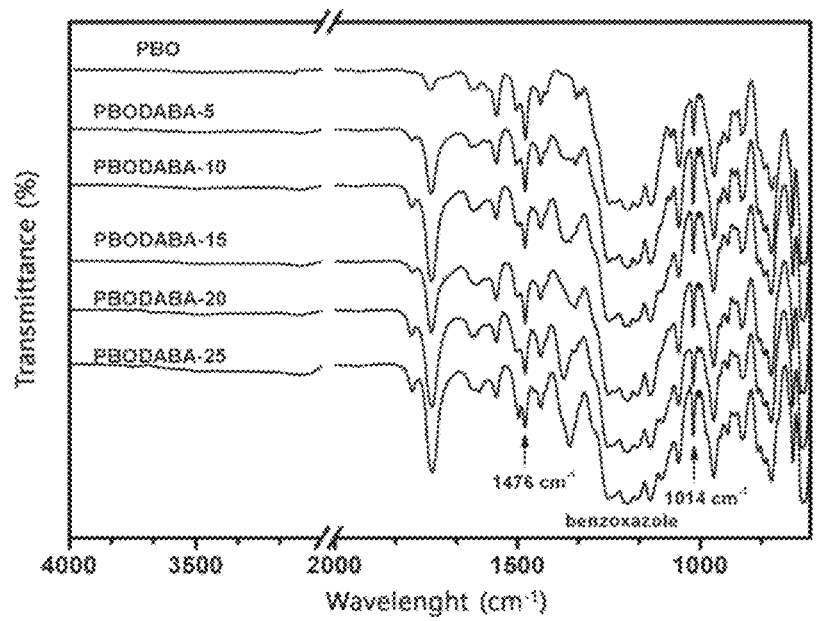
FIG. 3 shows ATR-FTIR spectra of crosslinked, thermally rearranged poly(benzoxazole-co-imide) copolymer membranes prepared according to Examples 2-6.

FIG. 3 shows the ATR-FTIR spectra of the crosslinked, thermally rearranged poly(benzoxazole-co-imide) copolymer membranes prepared by heat treatment only according to Examples 2-6 and a conventional polybenzoxazole (PBO) membrane. The disappearance of the O—H stretching peak around 3400 $cm^{-1}$ and the appearance of two distinct peaks around 1476 $cm^{-1}$ and 1014 $cm^{-1}$ attributable to a benzoxazole ring confirm the formation of a benzoxazole ring during the heat treatment. In addition, the presence of the absorption band characteristic of an imide ring confirms that the aromatic imide ring is thermally stable even under the heat treatment at 450° C.

<Chemical Formula 10>

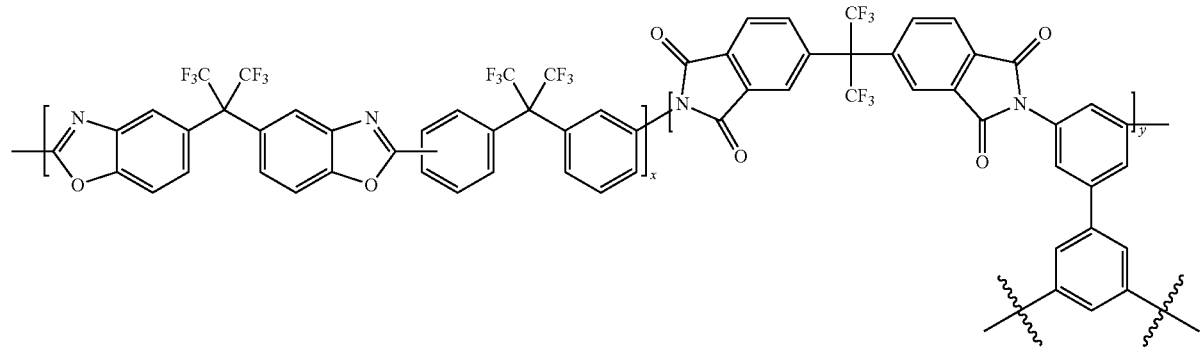

In Chemical Formula 7, x=0.95 and y=0.05.

FIG. 1 shows the $^1$H-NMR spectrum of the o-hydroxypolyimide copolymer having carboxylic acid groups synthesized in Synthesis Example 4 among the synthesis examples of o-hydroxypolyimide copolymers having carboxylic acid groups according to the present disclosure. The characteristic hydrogen peak in the repeat unit observed from the $^1$H-NMR spectrum confirms the synthesis of the o-hydroxypolyimide copolymer having carboxylic acid groups.

Figure 2:
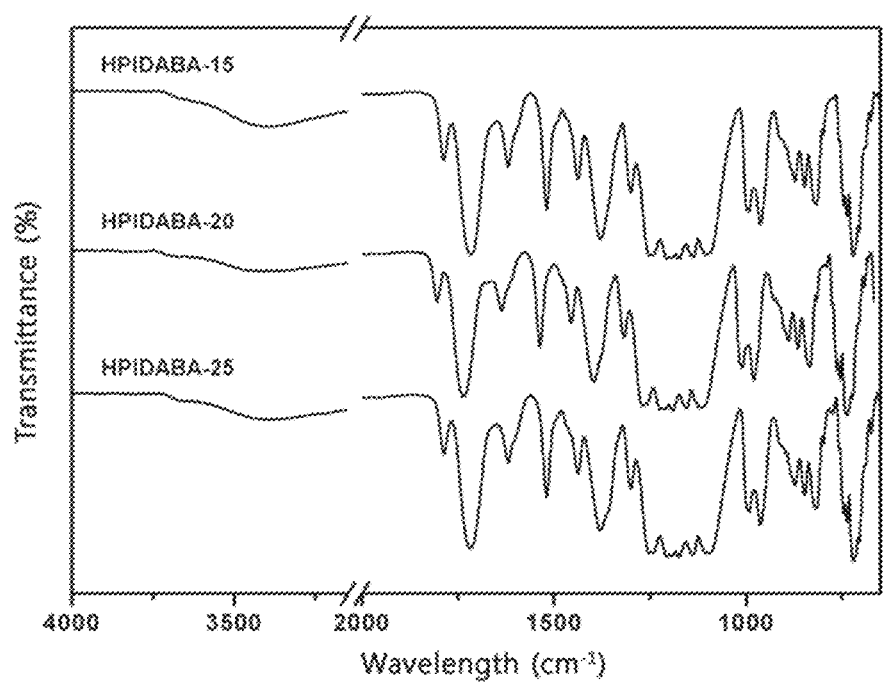
FIG. 2 shows ATR-FTIR spectra of HPIDABA-15, HPIDABA-20 and HPIDABA-25 membranes prepared according to Membrane Preparation Examples 4-6.

FIG. 2 shows the ATR-FTIR spectra of HPIDABA-15, HPIDABA-20 and HPIDABA-25 membranes prepared according to Membrane Preparation Examples 4-6 among the membrane preparation examples of o-hydroxypolyimide copolymer membranes having carboxylic acid groups according to the present disclosure. As seen from FIG. 2, the characteristic peaks such as the broad O—H stretching vibration peak around 3400 $cm^{-1}$, the C=O stretching vibration peaks at 1786 $cm^{-1}$ and 1716 $cm^{-1}$, the aromatic C—C absorption peaks at 1619 $cm^{-1}$ and 1519 $cm^{-1}$, the imide C—N stretching vibration peak around 1377 $cm^{-1}$, the The density and d-spacing of the samples prepared according to Membrane Preparation Examples 1-6, Examples 1-6, Reference Example 2 and Comparative Example 1 are given in Table 2. The d-spacing of the crosslinked, thermally rearranged poly(benzoxazole-co-imide) copolymer membranes according to Examples 1-6 was 0.62-0.67 nm, which was longer than those of the hydroxypolyimide copolymer membranes according to Membrane Preparation Examples 1-6 prior to thermal rearrangement (0.54-0.57 nm), the hydroxypolyimide copolymer membrane not containing DABA according to Reference Example 2 prior to thermal rearrangement (0.53 nm) and the uncrosslinked, thermally rearranged poly(benzoxazole-co-imide) copolymer membrane according to Comparative Example 1 (0.59 nm). Accordingly, it was confirmed that the average interchain distance increased remarkably, which is in good agreement with the fact that the density of the thermally rearranged poly(benzoxazole-co-imide) copolymer membrane (1.38-1.43 $g/cm^3$) was significantly decreased as compared to that of the hydroxypolyimide copolymer membrane prior to thermal rearrangement (1.50-1.52 g/cm³).

TABLE 2

| Samples | Density (g/cm³) | d-spacing (nm) |
|---|---|---|
| HPIDABA-2.5 | 1.51 | 0.54 |
| HPIDABA-5 | 1.52 | 0.55 |
| HPIDABA-10 | 1.51 | 0.55 |
| HPIDABA-15 | 1.51 | 0.54 |
| HPIDABA-20 | 1.52 | 0.57 |
| HPIDABA-25 | 1.50 | 0.55 |
| PBODABA-2.5 | 1.41 | 0.62 |
| PBODABA-5 | 1.42 | 0.62 |
| PBODABA-10 | 1.40 | 0.66 |
| PBODABA-15 | 1.38 | 0.67 |
| PBODABA-20 | 1.38 | 0.66 |
| PBODABA-25 | 1.43 | 0.65 |
| HPIMPD-5 | 1.50 | 0.53 |
| PBOMPD-5 | 1.45 | 0.59 |

Accordingly, since the crosslinked, thermally rearranged poly(benzoxazole-co-imide) copolymer membrane prepared according to the present disclosure has less packed polymer chains and a larger space, it allows small molecules to penetrate and diffuse and can be used as a gas separation membrane.

Figure 4:
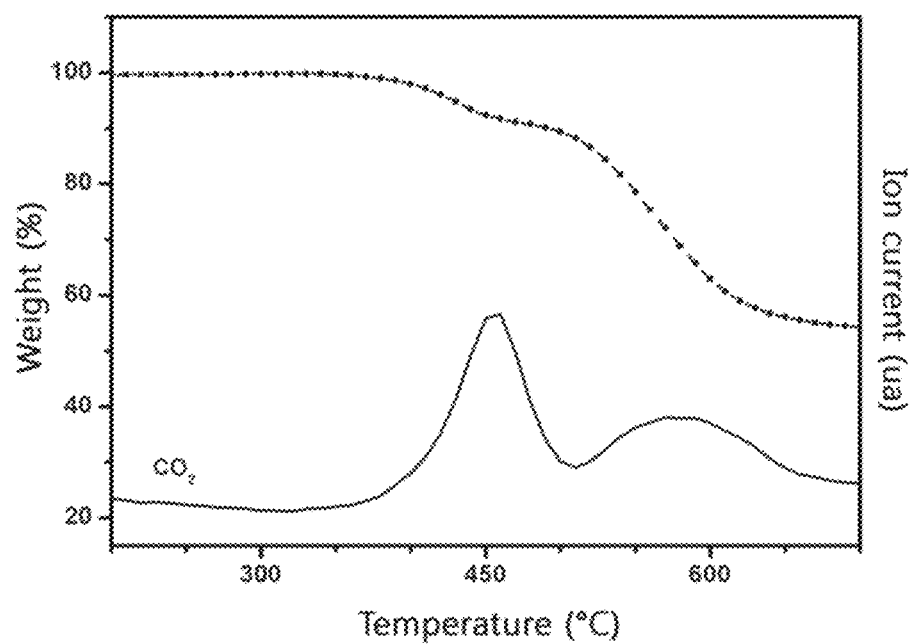
FIG. 4 shows thermogravimetric-mass spectroscopic (TG-MS) graphs showing thermal weight loss behaviors of a HPIDABA-25 membrane prepared according to Membrane Preparation Example 6.
Figure 5:
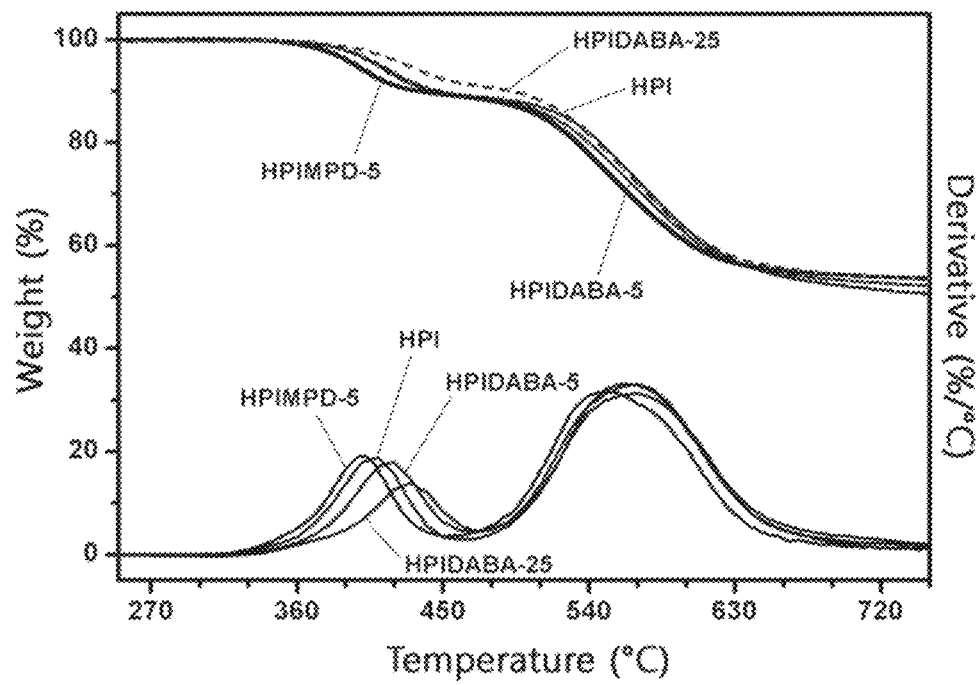
FIG. 5 shows TGA and DTG graphs of HPIDABA-5 and HPIDABA-25 membranes prepared according to Membrane Preparation Examples 2 and 6, a HPI membrane prepared according to Reference Example 1 and a HPIMPD-5 membrane prepared according to Reference Example 2.

FIG. 4 and FIG. 5 show a result of testing weight loss of the HPIDABA-5 and HPIDABA-25 according to Membrane Preparation Examples 2 and 6 and the HPI and HPIMPD-5 according to Reference Examples 1 and 2 caused by decarboxylation during the preparation of the thermally rearranged polybenzoxazole, using a thermogravimetric analyzer (TGA). Other thermal properties including the change in glass transition temperature are given in Table 3.

In FIG. 4, a distinct weight loss peak is observed at 370-450° C., which is below the typical polymer chain degradation temperature of 500-600° C. During this first weight loss, release of $CO_2$ was confirmed by mass spectroscopy, which means that thermal rearrangement occurs. In addition, it can be clearly seen from FIG. 5 that the thermal rearrangement temperature is affected by the fluidity of the polymer chains, which in turn is affected by the degree of crosslinking. This is also confirmed by the change in glass transition temperature and the change in the temperature at the maximum thermal rearrangement to PBO, given in Table 3.

TABLE 3

| Samples | $T_g^a$ (° C.) | $T_{TR}^b$ (° C.) | DABA $CO_2$ weight loss$^c$ (%) | Thermal rearrangement $CO_2$ weight loss$^d$ (%) | Total $CO_2$ weight loss$^d$ (%) | Total $CO_2$ weight loss$^e$ (%) |
|---|---|---|---|---|---|---|
| HPI | 300 | 407 | — | 11.36 | 11.36 | 11.25 |
| HPIDABA-2.5 | 308 | 410 | 0.20 | 11.08 | 11.28 | 11.04 |
| HPIDABA-5 | 305 | 417 | 0.39 | 10.79 | 11.18 | 11.04 |
| HPIDABA-10 | 313 | 426 | 0.78 | 10.22 | 11.00 | 8.98 |
| HPIDABA-15 | 314 | 430 | 1.18 | 9.66 | 10.84 | 8.87 |
| HPIDABA-20 | 314 | 423 | 1.57 | 9.09 | 10.66 | 9.98 |
| HPIDABA-25 | 300 | 429 | 1.96 | 8.52 | 10.48 | 8.80 |
| HPIMPD-5 | 280 | 400 | — | 10.79 | 10.79 | 10.78 |

$^a$Midpoint temperature scanned during 2nd DSC scanning at a heating rate of 20° C./min under nitrogen atmosphere.
$^b$Temperature at maximum weight loss or maximum thermal rearrangement to PBO.
$^c$Theoretical $CO_2$ weight loss corresponding to removal of DABA carboxylic acid groups.
$^d$Theoretical $CO_2$ weight loss corresponding to thermal rearrangement.
$^e CO_2$ weight loss measured during first stage in TGA.

In addition, the free volume size and distribution of the crosslinked, thermally rearranged poly(benzoxazole-co-imide) copolymer membranes PBODABA-5, PBODABA-10, PBODABA-15, PBODABA-20 and PBODABA-25 prepared according to Examples 1-6 and the uncrosslinked, thermally rearranged poly(benzoxazole-co-imide) copolymer membrane PBOMPD-5 prepared according to Comparative Example 1 were quantitatively analyzed by positron annihilation lifetime spectroscopy (PALS). The result is given in Table 4.

TABLE 4

| Samples | $T_3$ (ns) | $I_3$ (%) | $T_4$ (ns) | $I_4$ (%) | Pore diameter $d_3$ (Å) | Pore diameter $d_4$ (Å) |
|---|---|---|---|---|---|---|
| PBOMPD-5 | 1.118 ± 0.144 | 7.223 ± 0.936 | 3.750 ± 0.046 | 12.987 ± 0.369 | 3.69 ± 0.86 | 8.20 ± 0.11 |
| PBODABA-5 | 1.097 ± 0.112 | 7.040 ± 0.813 | 4.034 ± 0.041 | 12.316 ± 0.746 | 3.63 ± 0.68 | 8.52 ± 0.09 |
| PBODABA-10 | 1.073 ± 0.054 | 6.165 ± 0.416 | 4.146 ± 0.030 | 10.342 ± 0.097 | 3.55 ± 0.33 | 8.64 ± 0.06 |
| PBODABA-15 | 1.194 ± 0.053 | 6.655 ± 0.733 | 4.332 ± 0.011 | 11.942 ± 0.387 | 3.91 ± 0.30 | 8.84 ± 0.02 |
| PBODABA-20 | 1.155 ± 0.107 | 6.689 ± 0.770 | 4.198 ± 0.056 | 10.919 ± 0.332 | 3.80 ± 0.62 | 8.69 ± 0.12 |
| PBODABA-25 | 1.205 ± 0.121 | 6.257 ± 0.875 | 3.987 ± 0.037 | 11.887 ± 0.375 | 3.94 ± 0.67 | 8.47 ± 0.08 |

As can be seen from Table 4, the crosslinked, thermally rearranged poly(benzoxazole-co-imide) copolymer membranes PBODABA-Y according to the present disclosure have two o-Ps liftetimes $\tau_3$ and $\tau_4$, suggesting that two kinds of pores exist in the membrane. From the PALS analysis, ultramicropores having an average pore diameter $d_3$ of 4 Å, corresponding to $\tau_3 = \sim 1.2$ ns, and micropores having an average pore diameter $d_4$ of 8.6 Å, corresponding to $\tau_4 = \sim 4$ ns, were identified. The average pore diameter $d_3$ of the PBODABA-15, PBODABA-20 and PBODABA-25 and the average pore diameter $d_4$ of the PBODABA-5, PBODABA-10, PBODABA-15, PBODABA-20 and PBODABA-25 were larger than the average pore diameter of the PBOMPD-5 prepared according to Comparative Example 1.

Also, the permeability and selectivity of the crosslinked, thermally rearranged poly(benzoxazole-co-imide) copolymer membranes PBODABA-Y prepared according to Examples 1-6 and the uncrosslinked, thermally rearranged poly(benzoxazole-co-imide) copolymer membrane PBOMPD-5 prepared according to Comparative Example 1 for various gases were measured to evaluate gas separation performance. The result is given in Tables 5 and 6.

TABLE 5

| Samples | Gas permeability (Barrer)[a] | | | | | |
| --- | --- | --- | --- | --- | --- | --- |
| | He | $H_2$ | $CO_2$ | $O_2$ | $N_2$ | $CH_4$ |
| PBODABA-2.5 | 328 | 387 | 415 | 72 | 17 | 10.8 |
| PBODABA-5 | 422 | 540 | 600 | 115 | 28.1 | 18.6 |
| PBODABA-10 | 359 | 440 | 514 | 94 | 21.5 | 13.7 |
| PBODABA-15 | 398 | 522 | 615 | 117 | 28.8 | 19.6 |
| PBODABA-20 | 382 | 481 | 521 | 97.4 | 24.0 | 15.3 |
| PBODABA-25 | 342 | 446 | 498 | 95 | 24.7 | 17.3 |
| PBOMPD-5 | 427 | 469 | 358 | 82.5 | 20.5 | 13.0 |

[a] 1 Barrer = $10^{-10}$ cm$^3$ (STP) cm/(s cm$^2$ cmHg).

TABLE 6

| Samples | Selectivity[b] | | | | | |
| --- | --- | --- | --- | --- | --- | --- |
| | $O_2/N_2$ | $CO_2/N_2$ | $CO_2/CH_4$ | $CO_2/H_2$ | $H_2/CH_4$ | $N_2/CH_4$ |
| PBODABA-2.5 | 4.2 | 24.4 | 38.4 | 1.1 | 35.8 | 1.6 |
| PBODABA-5 | 4.1 | 21.3 | 32.3 | 1.1 | 29.0 | 1.5 |
| PBODABA-10 | 4.4 | 23.9 | 37.5 | 1.2 | 32.1 | 1.6 |
| XTR-PBOI-15 | 4.1 | 21.3 | 31.4 | 1.2 | 26.6 | 1.5 |
| PBODABA-20 | 4.1 | 21.7 | 34.1 | 1.1 | 31.4 | 1.6 |
| PBODABA-25 | 3.9 | 20.2 | 28.8 | 1.1 | 29.1 | 1.4 |
| PBOMPD-5 | 4.0 | 17.4 | 27.3 | 0.8 | 35.8 | 1.6 |

[b] Selectivity: ratio of permeabilities of two gases.

As seen from Tables 5 and 6, the crosslinked, thermally rearranged poly(benzoxazole-co-imide) copolymer membranes PBODABA-Y prepared according to Examples 1-6 show relatively higher permeability and selectivity than the uncrosslinked, thermally rearranged poly(benzoxazole-co-imide) copolymer membrane PBOMPD-5 prepared according to Comparative Example 1. In general, it is known that the gas permeability of glassy polymers is greatly dependent on the distribution of free volume elements. It was confirmed that the permeability coefficient of the PBODABA-Y membranes is higher than that of the PBOMPD-5 membrane, which agrees with the larger pore size confirmed by the PALS analysis.

The PBOMPD-5 membranes according to the present disclosure could overcome the permeability-selectivity tradeoff relationship owing to superior permeability and selectivity. In particular, for the $CO_2/CH_4$ mixture gas, the $CO_2$ selectivity was maintained high even with the very high permeability of 615 Barrer.

Accordingly, in accordance with the preparation method of the present disclosure, a crosslinked, thermally rearranged poly(benzoxazole-co-imide) copolymer membrane for gas separation may be prepared simply through heat treatment without requiring a complicated process such as chemical crosslinking, UV irradiation, etc. for forming the crosslinked structure and a gas separation membrane prepared therefrom is applicable to large-scale production due to superior permeability and selectivity and a simple preparation process.

Figure 6:
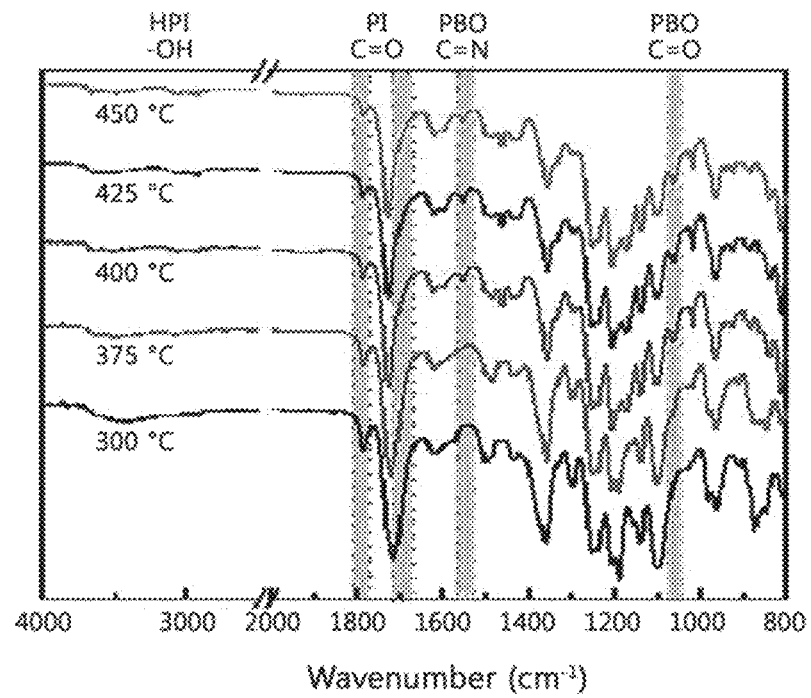
FIG. 6 shows ATR-FTIR spectra of a poly(benzoxazole-co-imide) copolymer prepared in Synthesis Example 17, obtained after thermal rearrangement at different temperatures.

FIG. 6 shows the ATR-FTIR spectra of poly(benzoxazole-co-imide) copolymer membranes obtained by thermally rearranging the copolymer obtained in Synthesis Example 17 at various heat treatment temperatures. As seen from FIG. 6, the broad hydroxypolyimide O—H stretching vibration peak around 3580 cm$^{-1}$ disappears gradually as the heat treatment temperature is raised from 375° C. to 450° C., which suggests the progress of thermal rearrangement to polybenzoxazole. Also, the appearance of the polybenzoxazole C=N peak (1550 cm$^{-1}$) and the characteristic C—O peak (1062 cm$^{-1}$), which were not observed at the heat treatment temperature 300° C., as the heat treatment temperature is raised from 375° C. to 450° C. confirms the thermal rearrangement to polybenzoxazole. In addition, the polyimide C=O stretching vibration peaks observed at 1784 cm$^{-1}$ and 1725 cm$^{-1}$ confirms the thermal stability of the aromatic imide ring even at the high heat treatment temperature of 450° C. Therefore, the heat treatment for the thermal rearrangement of hydroxypolyimide to polybenzoxazole according to the present disclosure may be conducted at 350-450° C., specifically 375-450° C.

The d-spacing and density of the samples prepared according to Examples 7-16 and Comparative Examples 2-3 are given in Table 7.

TABLE 7

| Samples | d-spacing (Å) | Density (g/cm$^3$) |
| --- | --- | --- |
| Example 7 | 6.67 | 1.38 |
| Example 8 | 6.74 | 1.40 |
| Example 9 | 6.79 | 1.40 |
| Example 10 | 6.70 | 1.42 |
| Example 11 | 6.72 | 1.43 |
| Example 12 | 6.52 | 1.40 |
| Example 13 | 6.57 | 1.41 |
| Example 14 | 6.39 | 1.39 |
| Example 15 | 6.53 | 1.38 |
| Example 16 | 6.55 | 1.40 |
| Comparative Example 2 | 6.37 | 1.41 |
| Comparative Example 3 | 6.20 | 1.43 |

As seen from Table 7, the d-spacing of the crosslinked, thermally rearranged poly(benzoxazole-co-imide) copolymers according to Examples 7-11 and Examples 12-16 were 6.67-6.79 Å and 6.39-6.57 Å, respectively, longer than that of the uncrosslinked, thermally rearranged poly(benzoxazole-co-imide) copolymer according to Comparative Example 2 (6.37 Å) and the crosslinked, thermally rearranged poly(benzoxazole-co-imide) copolymer lacking a polyimide structural unit derived from an aromatic diamine according to Comparative Example 3 (6.20 Å). Accordingly, it was confirmed that the average interchain distance increased, which is in good agreement with the fact that the density of the crosslinked, thermally rearranged poly(benzoxazole-co-imide) copolymers according to Examples 7-11 and Examples 12-16 (1.38-1.43 g/cm$^3$ and 1.38-1.41 g/cm$^3$, respectively) was significantly decreased as compared to that of the thermally rearranged poly(benzoxazole-co-imide) copolymers according to Comparative Examples 2-3. Accordingly, since the crosslinked, thermally rearranged poly(benzoxazole-co-imide) copolymer prepared according to the present disclosure has less packed polymer chains and a larger space, it allows small molecules to penetrate and diffuse and can be used as a gas separation membrane.

The mechanical and thermal properties and membrane area shrinkage during thermal rearrangement of the samples prepared according to Examples 7-16 and Comparative Examples 2-3 are given in Table 8.

TABLE 8

| Samples | Tensile strength (Mpa) | Elongation (%) | Shrinkage (%) | $T_{TR}{}^a$ (° C.) | $T_g{}^b$ (° C.) |
|---|---|---|---|---|---|
| Example 7 | 98 | 20 | 13 | 407 | 398 |
| Example 8 | 106 | 22 | 12 | 426 | 402 |
| Example 9 | 107 | 22 | 11 | 430 | 405 |
| Example 10 | 79 | 16 | 12 | 412 | 402 |
| Example 11 | 98 | 20 | 12 | 415 | 410 |
| Example 12 | 99 | 24 | 15 | 413 | 398 |
| Example 13 | 96 | 21 | 12 | 430 | 405 |
| Example 14 | 90 | 19 | 11 | 435 | 410 |
| Example 15 | 94 | 20 | 12 | 420 | 390 |
| Example 16 | 100 | 18 | 12 | 423 | 388 |
| Comparative Example 2 | 38 | 6 | 16 | 445 | 385 |
| Comparative Example 3 | 45 | 5 | 20 | 412 | 305 |

$^a$Highest temperature at which thermal rearrangement occurs.
$^b$Glass transition temperature.

As seen from Table 8, the samples prepared according to Examples 7-16 showed superior mechanical properties when compared with the samples prepared according to Comparative Examples 2-3, with 2 times or stronger tensile strength and 4 times or higher elongation. In particular, since the samples of Examples 7-16 showed less membrane area shrinkage as compared to the samples of Comparative Examples 2-3, it is expected that large-area membranes can be produced in large scale according to the present disclosure.

Since the crosslinked, thermally rearranged poly(benzoxazole-co-imide) copolymer prepared according to the present disclosure is prepared from a terpolymer having a repeat unit consisting of an o-hydroxypolyimide structural unit, a polyimide structural unit and a polyimide structural unit having carboxylic acid groups, the target product, i.e. the crosslinked, thermally rearranged poly(benzoxazole-co-imide) copolymer, has the content of the benzoxazole groups in the polymer chain of less than 80%. Accordingly, it exhibits superior mechanical properties and less membrane area shrinkage as compared to an uncrosslinked, thermally rearranged poly(benzoxazole-co-imide) copolymer prepared from a biopolymer having a repeat unit consisting of an o-hydroxypolyimide structural unit and a polyimide structural unit or a crosslinked, thermally rearranged poly(benzoxazole-co-imide) copolymer lacking a polyimide structural unit derived from an aromatic diamine, whose content of the benzoxazole groups in the polymer chain is 80% or higher.

In addition, the superior thermal properties of the samples prepared according to Examples 7-16 as compared to the samples prepared according to Comparative Examples 2-3 is confirmed by the highest temperature at which thermal rearrangement occurs and glass transition temperature described in Table 8.

The permeability of the samples prepared according to Examples 7-16 and the samples prepared according to Comparative Examples 2-3 for various gases was measured to evaluate gas separation performance. The result is given in Table 9.

TABLE 9

| | Gas permeability (Barrer)$^a$ | | | | | |
|---|---|---|---|---|---|---|
| Samples | He | $H_2$ | $O_2$ | $N_2$ | $CH_4$ | $CO_2$ |
| Example 7 | 412 | 679 | 166 | 45 | 41 | 855 |
| Example 8 | 330 | 505 | 117 | 36 | 31 | 620 |
| Example 9 | 300 | 498 | 100 | 32 | 28 | 540 |
| Example 10 | 425 | 690 | 172 | 48 | 42 | 900 |
| Example 11 | 428 | 700 | 181 | 50 | 45 | 936 |
| Example 12 | 421 | 679 | 183 | 53 | 46 | 901 |
| Example 13 | 345 | 554 | 124 | 33 | 26 | 679 |
| Example 14 | 450 | 699 | 193 | 48 | 46 | 980 |
| Example 15 | 430 | 680 | 185 | 41 | 40 | 910 |
| Example 16 | 440 | 700 | 201 | 42 | 41 | 950 |
| Comparative Example 2 | 372 | 552 | 120 | 32 | 24 | 676 |
| Comparative Example 3 | 446 | 603 | 133 | 30 | 20 | 746 |

$^a$1 Barrer = $10^{-10}$ cm$^3$ (STP) cm/(s cm$^2$ cmHg).

From Table 9, it can be seen that the crosslinked, thermally rearranged poly(benzoxazole-co-imide) copolymer membranes prepared according to Examples 7-11 exhibit high permeability for almost all the gases when compared with the thermally rearranged poly(benzoxazole-co-imide) copolymer membranes prepared according to Comparative Examples 2-3.

Figure 7:
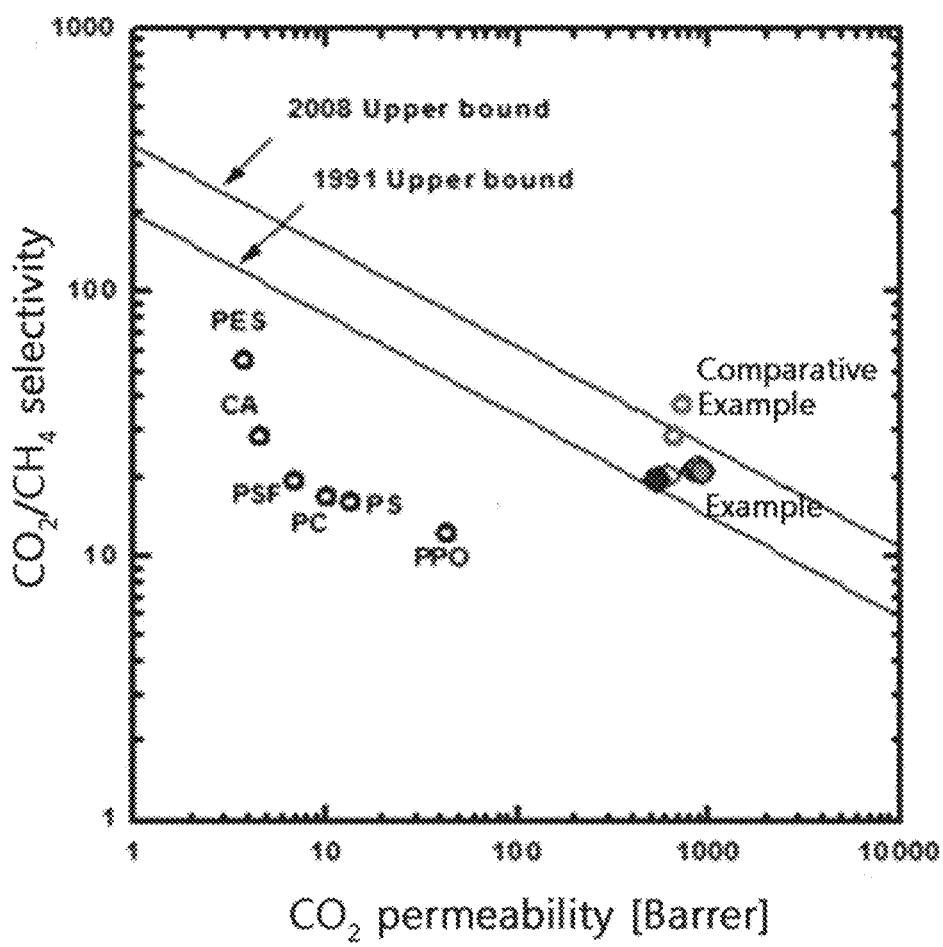
FIG. 7 shows $CO_2$ permeability and selectivity of poly (benzoxazole-co-imide) copolymer membranes prepared according to Examples 7-11 and Comparative Examples 2-3 for a $CO_2/CH_4$ mixture gas.
Figure 8:
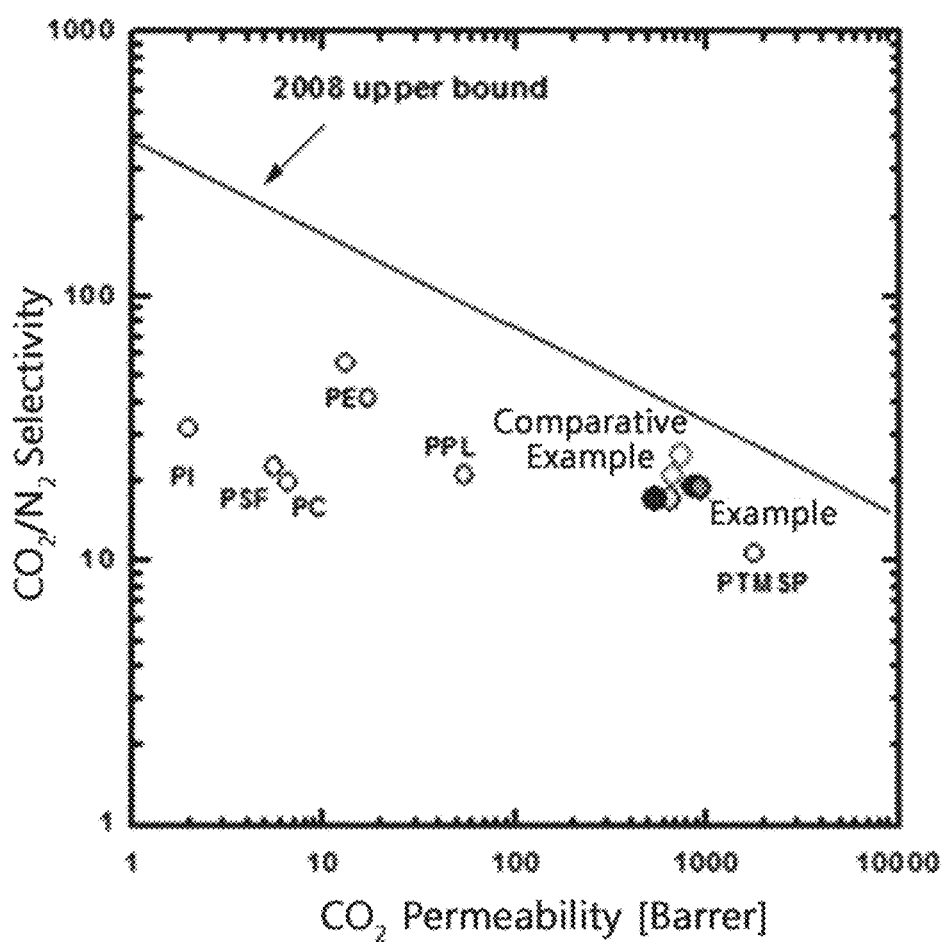
FIG. 8 shows $CO_2$ permeability and selectivity of poly (benzoxazole-co-imide) copolymer membranes prepared according to Examples 7-11 and Comparative Examples 2-3 for a $CO_2/N_2$ mixture gas.
Figure 9:
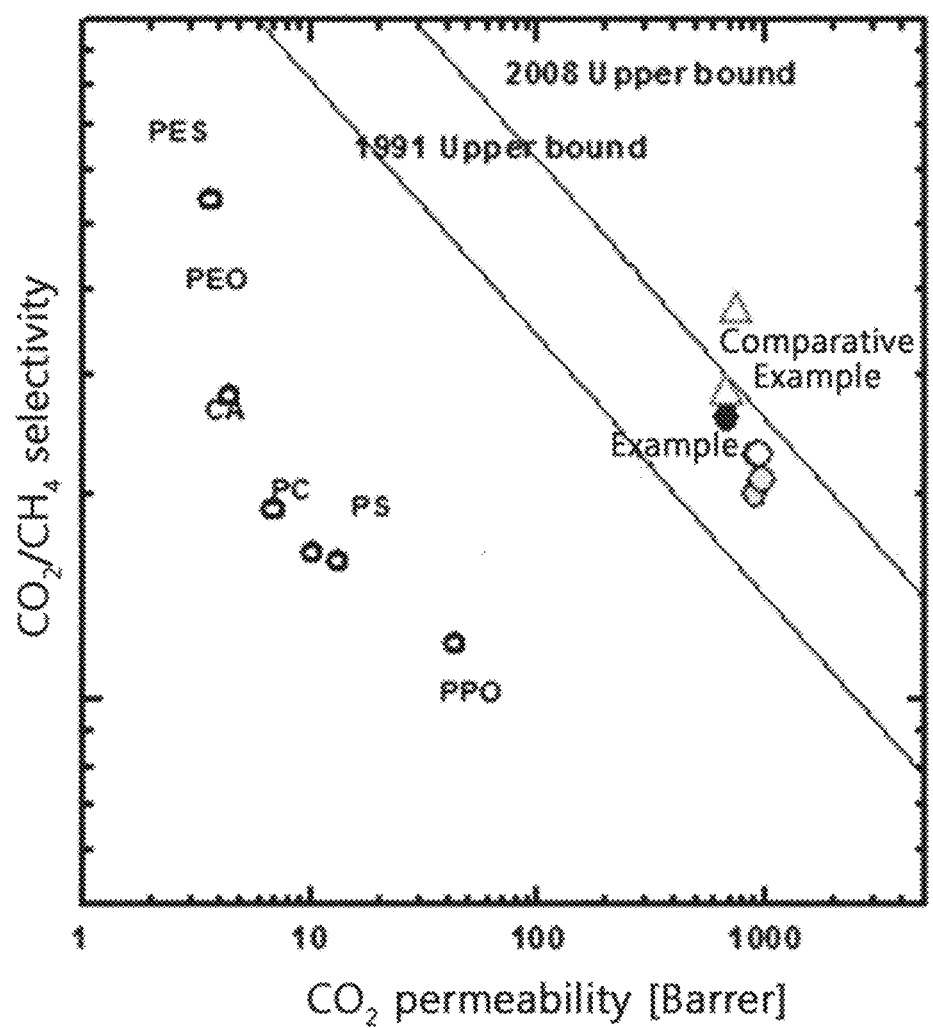
FIG. 9 shows $CO_2$ permeability and selectivity of poly (benzoxazole-co-imide) copolymer membranes prepared according to Examples 12-16 and Comparative Examples 2-3 for a $CO_2/CH_4$ mixture gas.
Figure 10:
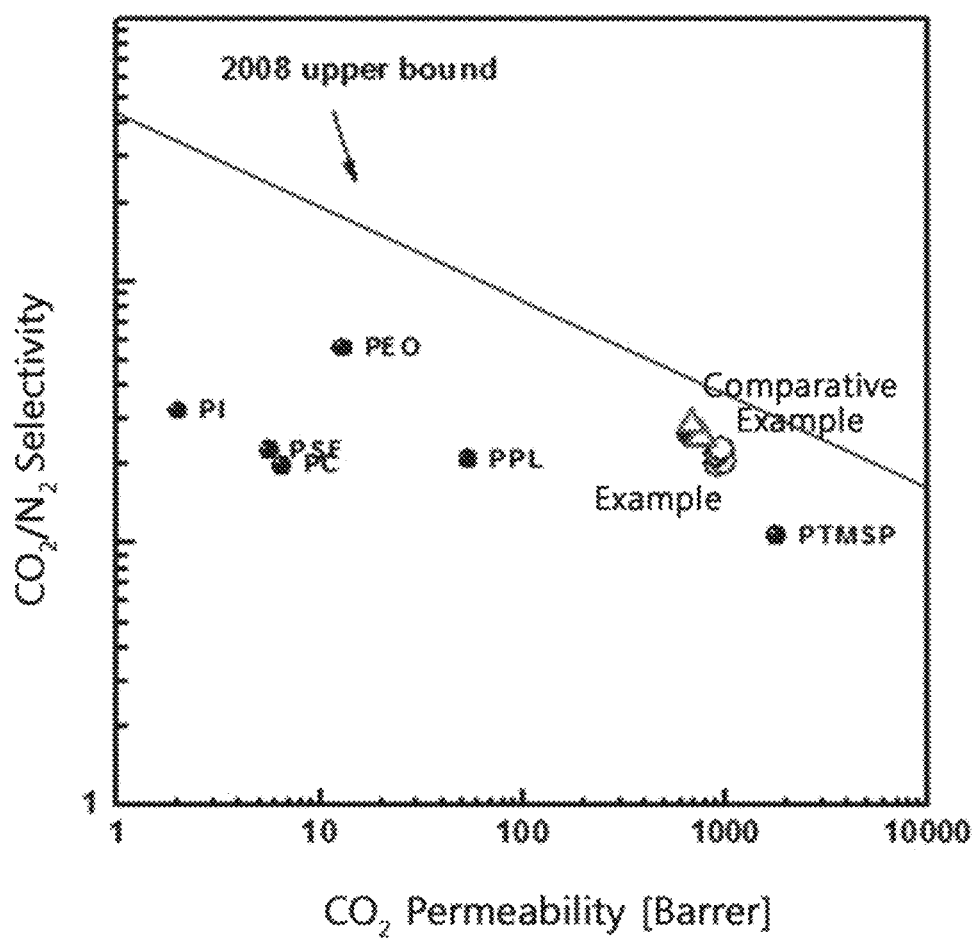
FIG. 10 shows $CO_2$ permeability and selectivity of poly (benzoxazole-co-imide) copolymer membranes prepared according to Examples 12-16 and Comparative Examples 2-3 for a $CO_2/N_2$ mixture gas.

FIG. 7 and FIG. 8 show the gas separation performance of the gas separation membranes according to Examples 7-11 for $CO_2/CH_4$ and $CO_2/N_2$ mixture gases and FIG. 9 and FIG. 10 show the gas separation performance of the gas separation membranes according to Examples 12-16 for $CO_2/CH_4$ and $CO_2/N_2$ mixture gases. Gas permeability and selectivity were compared with those of a commercially available gas separation membrane. Since the crosslinked, thermally rearranged poly(benzoxazole-co-imide) copolymer membranes prepared according to Examples 7-16 exhibit remarkably high $CO_2$ permeability and comparable $CO_2$ selectivity over $CH_4$ and $N_2$ when compared with the commercially available gas separation membrane, they exhibit superior gas separation performance.

Accordingly, the gas separation membrane (a membrane for flue gas separation is excluded) containing the novel crosslinked, thermally rearranged poly(benzoxazole-co-imide) copolymer wherein the content of the benzoxazole groups in the polymer chain is less than 80% according to the present disclosure exhibits superior mechanical and thermal properties, decreased membrane area shrinkage and excellent gas separation performance with superior gas permeability and selectivity.

In addition, since the gas separation membrane containing the novel crosslinked, thermally rearranged poly(benzoxazole-co-imide) copolymer wherein the content of the benzoxazole groups in the polymer chain is less than 80% can be prepared simply through heat treatment without requiring a complicated process such as chemical crosslinking, UV irradiation, etc. for forming the crosslinked structure and thus the preparation process is simple and economical, the present disclosure is applicable to large-scale production.

The invention claimed is:

1. A crosslinked, thermally rearranged poly(benzoxazole-co-imide) copolymer having a repeat unit represented by Chemical Formula 2:

<Chemical Formula 2>

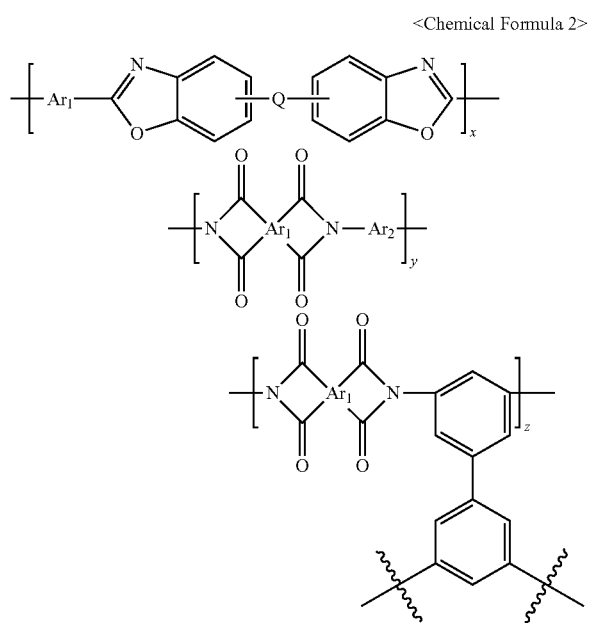

wherein $Ar_1$ is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, $Ar_2$ is an aromatic ring group selected from a substituted or unsubstituted divalent $C_6$-$C_{24}$ arylene group and a substituted or unsubstituted divalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, and x, y and z are molar fractions in the repeat unit, satisfying x<0.8 and x+y+z=1, except for the case where x, y or z is 0.

2. The crosslinked, thermally rearranged poly(benzoxazole-co-imide) copolymer according to claim 1, wherein the copolymer has a d-spacing of 6.67-6.79 Å.

3. The crosslinked, thermally rearranged poly(benzoxazole-co-imide) copolymer according to claim 1, wherein the copolymer has a density of 1.38-1.43 g/cm³.

4. A method for preparing the crosslinked, thermally rearranged poly(benzoxazole-co-imide) copolymer having a repeat unit represented by Chemical Formula 2 according to claim 1, comprising:

I) obtaining a polyamic acid solution by reacting an acid dianhydride, an o-hydroxydiamine and an aromatic diamine and 3,5-diaminobenzoic acid, as comonomers, and synthesizing an o-hydroxypolyimide copolymer having carboxylic acid groups through azeotropic thermal imidization;

II) synthesizing a monoesterified o-hydroxypolyimide copolymer by reacting the polyimide copolymer of I) with a diol;

III) synthesizing a crosslinked o-hydroxypolyimide copolymer by transesterification crosslinking the monoesterified o-hydroxypolyimide copolymer of II); and IV) thermally rearranging the crosslinked o-hydroxypolyimide copolymer of III).

5. The method for preparing the crosslinked, thermally rearranged poly(benzoxazole-co-imide) copolymer having a repeat unit represented by Chemical Formula 2 according to claim 4, wherein the acid dianhydride in I) is represented by General Formula 3:

<General Formula 3>

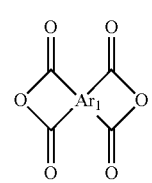

wherein $Ar_1$ is an aromatic ring group selected from a substituted or unsubstituted tetravalent $C_6$-$C_{24}$ arylene group and a substituted or unsubstituted tetravalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH.

6. The method for preparing the crosslinked, thermally rearranged poly(benzoxazole-co-imide) copolymer having a repeat unit represented by Chemical Formula 2 according to claim 4, wherein the o-hydroxydiamine in I) is represented by General Formula 2:

<General Formula 2>

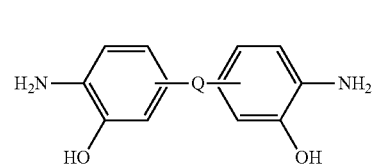

wherein Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group.

7. The method for preparing the crosslinked, thermally rearranged poly(benzoxazole-co-imide) copolymer having a repeat unit represented by Chemical Formula 2 according to claim 4, wherein the aromatic diamine in I) is represented by General Formula 4:

   <General Formula 4> wherein $Ar_2$ is an aromatic ring group selected from a substituted or unsubstituted divalent $C_6$-$C_{24}$ arylene group and a substituted or unsubstituted divalent $C_4$-$C_{24}$ heterocyclic ring group, wherein the aromatic ring group exists on its own, forms a condensed ring with each other, or is linked with each other by a single bond, O, S, CO, $SO_2$, $Si(CH_3)_2$, $(CH_2)_p$ (1≤p≤10), $(CF_2)_q$ (1≤q≤10), $C(CH_3)_2$, $C(CF_3)_2$ or CO—NH.

8. The method for preparing the crosslinked, thermally rearranged poly(benzoxazole-co-imide) copolymer having a repeat unit represented by Chemical Formula 2 according to claim 4, wherein the azeotropic thermal imidization in I) is conducted by adding toluene or xylene to the polyamic acid solution and stirring the mixture at 180-200° C. for 6-12 hours.

9. The method for preparing the crosslinked, thermally rearranged poly(benzoxazole-co-imide) copolymer having a repeat unit represented by Chemical Formula 2 according to claim 4, wherein the diol in II) is selected from a group consisting of ethylene glycol, propylene glycol, 1,4-butylene glycol, 1,3-propanediol, 1,2-butanediol, 1,3-butanediol and benzenedimethanol.

10. The method for preparing the crosslinked, thermally rearranged poly(benzoxazole-co-imide) copolymer having a repeat unit represented by Chemical Formula 2 according to claim 4, wherein the monoesterification in II) is conducted by reacting the copolymer of I) with an excess diol corresponding to 50 or more equivalents of the carboxylic acid groups in the copolymer at 140-160° C. for 18-24 hours in the presence of a p-toluenesulfonic acid catalyst.

11. The method for preparing the crosslinked, thermally rearranged poly(benzoxazole-co-imide) copolymer having a repeat unit represented by Chemical Formula 2 according to claim 4, wherein the transesterification crosslinking in III) is conducted by heat-treating the copolymer at 200-250° C. for 18-24 hours in vacuo.

12. The method for preparing the crosslinked, thermally rearranged poly(benzoxazole-co-imide) copolymer having a repeat unit represented by Chemical Formula 2 according to claim 4, wherein the thermal rearrangement in IV) is conducted by raising temperature to 350-450° C. at a rate of 1-20° C./min under high-purity inert gas atmosphere and maintaining the temperature for 0.1-3 hours.

* * * * *